(12) United States Patent
Xue

(10) Patent No.: US 12,200,047 B2
(45) Date of Patent: Jan. 14, 2025

(54) SERVICE UNIT SWITCHING METHOD, SYSTEM, AND DEVICE FOR DISASTER TOLERANCE SWITCHING AND CAPACITY DISPATCHING

(71) Applicant: Alibaba Group Holding Limited, Grand Cayman (KY)

(72) Inventor: Bengbeng Xue, Hangzhou (CN)

(73) Assignee: Alibaba Group Holding Limited, George Town (KY)

( * ) Notice: Subject to any disclaimer, the term of this patent is extended or adjusted under 35 U.S.C. 154(b) by 0 days.

(21) Appl. No.: 17/571,245

(22) Filed: Jan. 7, 2022

(65) Prior Publication Data
US 2022/0131935 A1  Apr. 28, 2022

Related U.S. Application Data

(63) Continuation of application No. PCT/CN2020/100053, filed on Jul. 3, 2020.

(51) Int. Cl.
*H04L 67/1036* (2022.01)
*H04L 41/0816* (2022.01)
(Continued)

(52) U.S. Cl.
CPC ...... *H04L 67/1036* (2013.01); *H04L 41/0816* (2013.01); *H04L 41/0853* (2013.01);
(Continued)

(58) Field of Classification Search
CPC H04L 67/1036; H04L 41/0853; H04L 67/101
(Continued)

(56) References Cited

U.S. PATENT DOCUMENTS 7,949,757 B2  5/2011 Joshi
8,243,589 B1 *  8/2012 Trost ................... H04L 67/1034
370/235

(Continued)

FOREIGN PATENT DOCUMENTS

CN    1230311    1/2003
CN    101166176  4/2008
(Continued)

OTHER PUBLICATIONS

Translation of International Search Report mailed Oct. 10, 2020, from corresponding PCT Application No. PCT/CN2020/100053, 2 pages.
(Continued)

*Primary Examiner* — Hee Soo Kim
(74) *Attorney, Agent, or Firm* — Lee & Hayes, P.C.

(57) ABSTRACT

A method, a system, and a device for switching a service unit are provided. The method includes: determining a target service unit; and triggering the target service unit to publish first routing information according to configuration information of a first service unit for a first load balancing task, so as to replace the first service unit to provide a traffic distribution service for the first load balancing task. When the entire service network needs to perform disaster tolerance switching and capacity dispatching, the method provided in the embodiments of this application can effectively improve the real-time performance of traffic switching, and avoid the problem of relatively poor real-time performance of traffic switching caused by the influence of DNS cache in the existing technologies.

20 Claims, 13 Drawing Sheets

(51) Int. Cl.
  *H04L 41/0853* (2022.01)
  *H04L 47/2408* (2022.01)
  *H04L 67/101* (2022.01)
  *H04L 67/1095* (2022.01)
(52) U.S. Cl.
  CPC ........ *H04L 47/2408* (2013.01); *H04L 67/101* (2013.01); *H04L 67/1095* (2013.01)
(58) Field of Classification Search
  USPC .......................................................... 709/221
  See application file for complete search history.

(56) References Cited

U.S. PATENT DOCUMENTS

| | | | |
|---|---|---|---|
| 8,484,656 | B2 | 7/2013 | Raja et al. |
| 8,510,428 | B2 | 8/2013 | Joshi |
| 8,549,148 | B2 | 10/2013 | Devarapalli et al. |
| 8,812,904 | B2 | 8/2014 | Kamath et al. |
| 8,825,859 | B2 | 9/2014 | Mutnuru et al. |
| 8,972,602 | B2 | 3/2015 | Mithyantha |
| 9,137,165 | B2 | 9/2015 | Anand et al. |
| 9,584,360 | B2 | 2/2017 | Joshi |
| 9,589,029 | B2 | 3/2017 | Choudhary et al. |
| 2006/0092950 | A1* | 5/2006 | Arregoces ............... H04L 45/28 370/396 |
| 2010/0309795 | A1* | 12/2010 | Shah ....................... H04L 45/54 370/252 |
| 2011/0283013 | A1* | 11/2011 | Grosser ................. H04L 61/103 709/232 |
| 2014/0223435 | A1* | 8/2014 | Chang ................. G06F 9/45558 718/1 |
| 2014/0310391 | A1* | 10/2014 | Sorenson, III ...... H04L 43/0817 709/223 |
| 2015/0149635 | A1* | 5/2015 | Rajagopalan ......... G06F 9/5083 709/226 |
| 2015/0229775 | A1 | 8/2015 | Kamboh et al. |
| 2019/0028538 | A1* | 1/2019 | Chen ................... H04L 67/1034 |
| 2020/0244620 | A1* | 7/2020 | Lin ..................... H04L 61/2517 |

FOREIGN PATENT DOCUMENTS

| | | |
|---|---|---|
| CN | 101340371 | 1/2009 |
| CN | 102611735 | 7/2012 |
| CN | 103259809 A | 8/2013 |
| CN | 105376317 | 3/2016 |
| CN | 106549875 | 3/2017 |
| CN | 107231221 A | 10/2017 |
| CN | 107231399 A | 10/2017 |
| WO | WO2016011752 | 1/2016 |

OTHER PUBLICATIONS

Translation of Written Opinion mailed Oct. 10, 2020, from PCT Application No. PCT/CN2020/100053, 3 pages.
English Translation of Chinese Office Action for corresponding Chinese applcaition No. 201910614678.1 dated Dec. 20, 2022.
English Translation of Chinese Search Report for corresponding Chinese applcaition No. 201910614678.1 dated Dec. 20, 2022.

* cited by examiner

SERVICE UNIT SWITCHING METHOD, SYSTEM, AND DEVICE FOR DISASTER TOLERANCE SWITCHING AND CAPACITY DISPATCHING

CROSS REFERENCE TO RELATED PATENT APPLICATIONS

This application claims priority to and is a continuation of PCT Patent Application No. PCT/CN2020/100053 filed on 3 Jul. 2020, and is related to and claims priority to Chinese Application No. 201910614678.1, filed on 9 Jul. 2019 and entitled "Service Unit Switching Method, System, and Device," which are hereby incorporated by reference in their entirety.

TECHNICAL FIELD

The present disclosure relates to the field of Internet technology, and in particular, to service unit switching methods, systems, and devices.

BACKGROUND

Multiple service clusters of SLB (Server Load Balance) products are distributed over multiple countries around the world, multiple regions in each country, and multiple computer rooms in each region. These clusters form a complex and huge service network. Each cluster is a service unit of such network. In order to ensure the stability of the entire service network, service dispatching and service disaster tolerance capabilities of a system are extremely critical.

At present, in existing technologies, DNS (domain name system) domain name resolution is usually used to switch and map to a different VIP (Virtual IP Address, virtual service address) to implement disaster tolerance switching and capacity dispatching of a service system.

However, switching a DNS domain name resolution is affected by a DNS cache, making it unable to take effect in real time, which in turn affects the stability of the entire service network to a certain extent.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or processor-readable/computer-readable instructions as permitted by the context above and throughout the present disclosure.

In view of the aforementioned problems, the present disclosure is proposed to provide a method, a system, and a device for switching a service unit to solve the aforementioned problems or at least partially solves the aforementioned problems.

Therefore, in the embodiments of the present disclosure, a service unit switching method is provided. The method includes:
determining a target service unit; and
triggering the target service unit to publish first routing information according to configuration information of a first service unit for a first load balancing task, so as to replace the first service unit to provide a traffic distribution service for the first load balancing task.

In the embodiments of the present disclosure, a service unit switching method is provided. The method includes:
obtaining configuration information of a first service unit for a first load balancing task; and
publishing first routing information according to the configuration information, so as to replace the first service unit to provide a traffic distribution service for the first load balancing task.

In the embodiments of the present disclosure, a service unit switching system is provided. The system includes:
a first service unit, a target service unit, and a first management and control unit that is respectively connected to the first service unit and the target service unit;
the first management and control unit configured to determine a target service unit; trigger the target service unit to publish first routing information according to configuration information of the first service unit for a first load balancing task; and
the target service unit configured to publish the first routing information according to the configuration information upon being triggered by the first management and control unit, to replace the first service unit to provide a traffic distribution service for the first load balancing task.

In the embodiments of the present disclosure, a service unit switching system is provided. The system includes:
a first service unit, a target service unit, a first management and control unit connected to the first service unit, and a target management and control unit connected to the target service unit;
the first management and control unit configured to obtain configuration information of the first service unit for a first load balancing task; and send the configuration information to the target management and control unit;
the target management and control unit configured to forward the configuration information to the target service unit; and trigger the target service unit to publish first routing information according to the configuration information; and
the target service unit is configured to publish the first routing information according to the configuration information upon being triggered by the target management and control unit, to replace the first service unit to provide a traffic distribution service for the first load balancing task.

In the embodiments of the present disclosure, an electronic device is provided. The device includes:
a memory and a processor, wherein:
the memory is configured to store a program;
the processor is coupled with the memory, and is configured to execute the program stored in the memory for:
determining a target service unit; and
triggering the target service unit to publish first routing information according to configuration information of a first service unit for a first load balancing task, so as to replace the first service unit to provide a traffic distribution service for the first load balancing task.

In the embodiments of the present disclosure, an electronic device is provided. The device includes: a memory and a processor, wherein:
the memory is configured to store a program;
the processor is coupled with the memory, and is configured to execute the program stored in the memory for:
obtaining configuration information of a first service unit for a first load balancing task; and publishing first routing information according to the configuration information, so as to replace the first service unit to provide a traffic distribution service for the first load balancing task.

In the embodiments of the present disclosure, a service unit switching method is provided. The method includes:
determining a target service unit; and
triggering the target service unit to publish first routing information according to configuration information of a first service unit for a first task, so as to replace the first service unit to provide a traffic distribution service for the first task.

In the embodiments of the present disclosure, an electronic device is provided. The device includes: a memory and a processor, wherein:
the memory is used to store a program;
the processor is coupled with the memory, and is configured to execute the program stored in the memory for:
determining a target service unit; and
triggering the target service unit to publish first routing information according to configuration information of a first service unit for a first task, so as to replace the first service unit to provide a traffic distribution service for the first task.

In the embodiments of the present disclosure, a service unit switching method is provided. The method includes:
obtaining configuration information of a first service unit for a first task; and
publishing first routing information according to the configuration information, to replace the first service unit to provide services for the first task.

In the embodiments of the present disclosure, an electronic device is provided. The device includes: a memory and a processor, wherein:
the memory is used to store a program;
the processor is coupled with the memory, and is configured to execute the program stored in the memory for:
obtaining configuration information of a first service unit for a first task; and
publishing first routing information according to the configuration information, to replace the first service unit to provide services for the first task.

In the technical solutions provided by the embodiments of the present disclosure, a first service unit first provides a traffic distribution service for a first load balancing task. When the entire service network needs to perform disaster tolerance switching and capacity dispatching, a target service unit publishes first routing information according to configuration information of the first service unit for the first load balancing task, and the traffic related to the first load balancing task can then be diverted to the target service unit. As such, the target service unit replaces the first service unit to provide the traffic distribution service for the first load balancing task. As can be seen, when the entire service network needs to perform disaster tolerance switching and capacity dispatching, the methods provided in the embodiments of the present disclosure can ensure the real-time performance of traffic switching related to the first load balancing task, and avoid the problem of relatively poor real-time performance of traffic switching caused by the influence of DNS caching in the existing technologies.

BRIEF DESCRIPTION OF THE DRAWINGS

In order to more clearly describe the technical solutions in the embodiments of the present disclosure, drawings that need to be used in the description of the embodiments or the existing technologies will be briefly introduced hereinafter. Apparently, the drawings in the following description represent some embodiments of the present disclosure. For one of ordinary skill in the art, other drawings can be obtained based on these drawings without making any creative effort.

DETAILED DESCRIPTION

Figure 1:
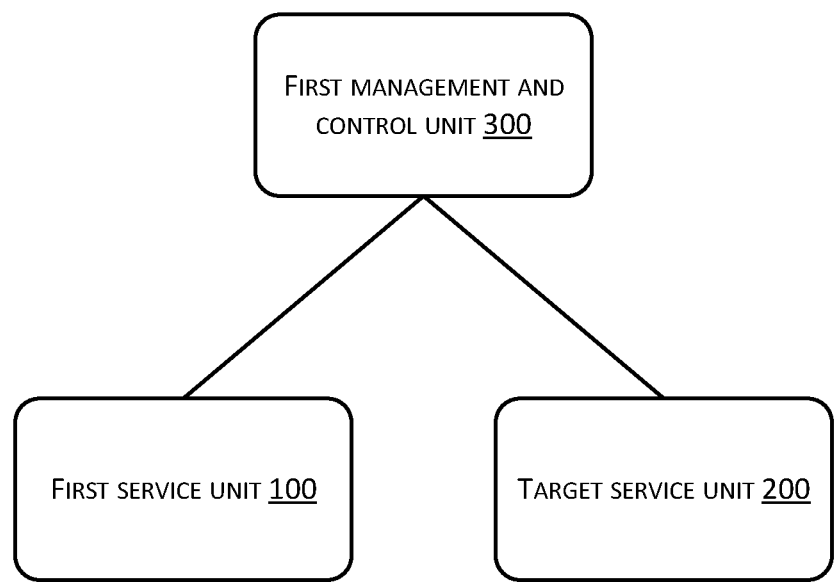
FIG. 1 is a structural block diagram of a service unit switching system provided by an embodiment of the present disclosure.

In the existing technologies, for a service system that provides services through a domain name, a same domain name can be mapped to different VIPs through the DNS domain name resolution, so as to implement disaster tolerance switching and capacity dispatching of the service system.

For example, for a service domain name www.A.com, a DNS server is configured to map the domain name to VIP-A of Hangzhou Computer Room A by default, and at the same time, set VIP-B of Hangzhou Computer Room B and VIP-C of Beijing Computer Room C as mapping backups. When a failure occurs in VIP-A, the DNS server will set www.A.com to be mapped to VIP-B to achieve traffic disaster tolerance switching.

In the current DNS domain name resolution system, a DNS caching mechanism is usually adopted. Specifically, after a client accesses a certain domain name normally, a DNS server will cache a VIP obtained by resolving the domain name. When the client accesses the domain name again, the client will directly extract and display a local DNS cache without requesting the DNS server to perform the domain name resolution again, which can speed up the resolution of the URL. However, the local DNS cache on the client will become invalid only when the predefined cache duration is reached. After invalidation, the client will request the DNS server to perform the domain name resolution again when the client accesses the domain name again. In other words, even if a configuration of domain name mapping in the DNS server is changed in the existing technologies, the real-time switching of service traffic cannot be realized. The switching of service traffic can only be completed when the local DNS cache on the client becomes invalid.

In addition, an established connection cannot be switched. This is because the established connection is based on TCP/IP protocol. A source address (that is, an IP address of an access requester), a source port (that is, a port of the access requester), and a destination address (that is, a virtual service address), and a target port (that is, the virtual service port) corresponding to the connection are fixed and cannot be changed. In the existing technologies, a virtual service address corresponding to a domain name is changed when the DNS domain name mapping is switched, but a target address of an established connection cannot be changed. This causes the established connection no longer to be usable, and so a normal switching cannot be implemented for the established connection, having a situation where the traffic of the established connection is damaged.

In order to enable one skilled in the art to better understand the solutions of the present disclosure, the technical solutions in the embodiments of the present disclosure will be described clearly and completely in conjunction hereinafter with the accompanying drawings in the embodiments of the present disclosure. Apparently, the described embodiments represent only a part and not all of the embodiments of the present disclosure. Based on the embodiments in the present disclosure, all other embodiments obtained by one skilled in the art without making any creative effort shall fall within the scope of protection of the present disclosure.

In addition, some processes described in the specification, claims, and the above-mentioned drawings of the present disclosure include multiple operations appearing in a specific order. These operations may be performed in the order that is not appeared in this article or in parallel. The serial numbers of operations, such as 101, 102, etc., are only used to distinguish different operations, and the serial numbers themselves do not represent any order of execution. In addition, these processes may include more or fewer operations, and these operations may be executed sequentially or concurrently. It should be noted that the descriptions such as "first" and "second", etc., in this article are used to distinguish different information, devices, modules, etc., and do not represent an order, and do not limit "first" and "second" are different types.

FIG. 1 shows a structural block diagram of a service unit switching system provided by an embodiment of the present disclosure. As shown in FIG. 1, the system includes: a first service unit 100, a target service unit 200, and a first management and control unit 300 individually connected to the first service unit 100 and the target service unit 200, wherein:

the first management and control unit 300 is configured to determine the target service unit 200; trigger the target service unit 200 to publish first routing information according to configuration information of the first service unit 100 for a first load balancing task;

the target service unit 200 is configured to publish the first routing information according to the configuration information upon being triggered by the first management and control unit 300, to replace the first service unit 100 to provide a traffic distribution service for the first load balancing task.

In this embodiment, the first management and control unit 300 can control the first service unit 100 and the target service unit 200 by sending control instructions to the first service unit 100 and the target service unit 200.

In the technical solutions provided by the embodiments of the present disclosure, a first service unit first provides a traffic distribution service for a first load balancing task. When the entire service network needs to perform disaster tolerance switching and capacity dispatching, a target service unit publishes first routing information according to configuration information of the first service unit for the first load balancing task, and the traffic related to the first load balancing task can then be diverted to the target service unit, so that the target service unit replaces the first service unit to provide the traffic distribution service for the first load balancing task. As can be seen, when the entire service network needs to perform disaster tolerance switching and capacity dispatching, the method provided in the embodiments of the present disclosure can ensure the real-time performance of traffic switching related to the first load balancing task, and avoid the problem of relatively poor real-time performance of traffic switching caused by the influence of DNS caching in the existing technologies.

Details of workflows of and signaling interactions between various components of the service unit switching system provided by the embodiments of the present disclosure, such as the first service unit, the target service unit, and the first management and control unit, will be further described in the following embodiments.

Figure 2:
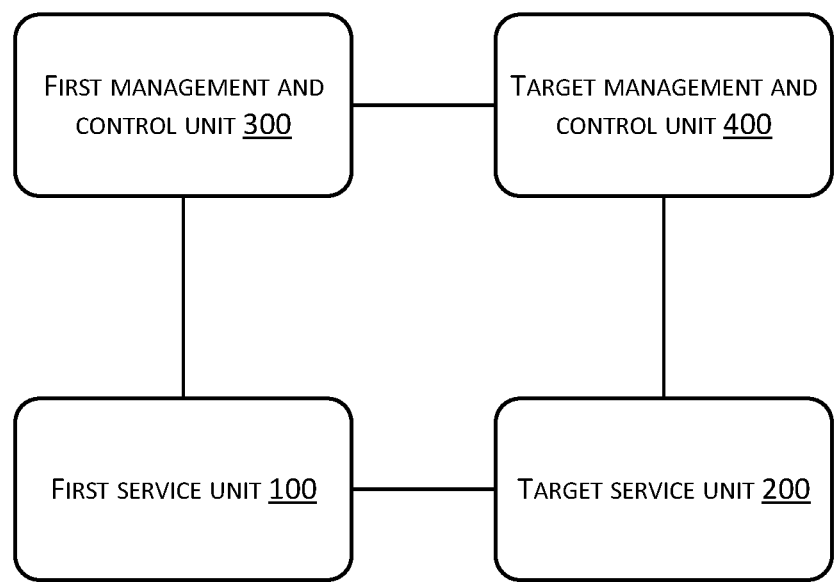
FIG. 2 is a structural block diagram of a service unit switching system provided by another embodiment of the present disclosure.

FIG. 2 shows a structural block diagram of a service unit switching system provided by another embodiment of the present disclosure. As shown in FIG. 2, the system includes: a first service unit 100, a target service unit 200, a first management and control unit 300 connected to the first service unit 100, and a target management and control unit 400 connected to the target service unit 200.

The first management and control unit 300 is configured to obtain configuration information of the first service unit 100 for a first load balancing task; send the configuration information to the target management and control unit 200.

The target management and control unit 400 is configured to forward the configuration information to the target service unit 200, and trigger the target service unit 200 to publish first routing information according to the configuration information.

The target service unit 200 is configured to publish the first routing information according to the configuration information upon being triggered by the target management and control unit 400, to replace the first service unit 100 to provide a traffic distribution service for the first load balancing task.

In this embodiment, the first service unit 100 and the target service unit 200 are controlled separately by the first management and control unit 300 and the target management and control unit 400.

In the technical solutions provided by the embodiments of the present disclosure, a first service unit first provides a traffic distribution service for a first load balancing task. When the entire service network needs to perform disaster tolerance switching and capacity dispatching, a target service unit publishes first routing information according to configuration information of the first service unit for the first load balancing task, and the traffic related to the first load balancing task can then be diverted to the target service unit, so that the target service unit replaces the first service unit to provide the traffic distribution service for the first load balancing task. As can be seen, when the entire service network needs to perform disaster tolerance switching and capacity dispatching, the method provided in the embodiments of the present disclosure can ensure the real-time performance of traffic switching related to the first load balancing task, and avoid the problem of relatively poor real-time performance of traffic switching caused by the influence of DNS caching in the existing technologies.

Figure 6:
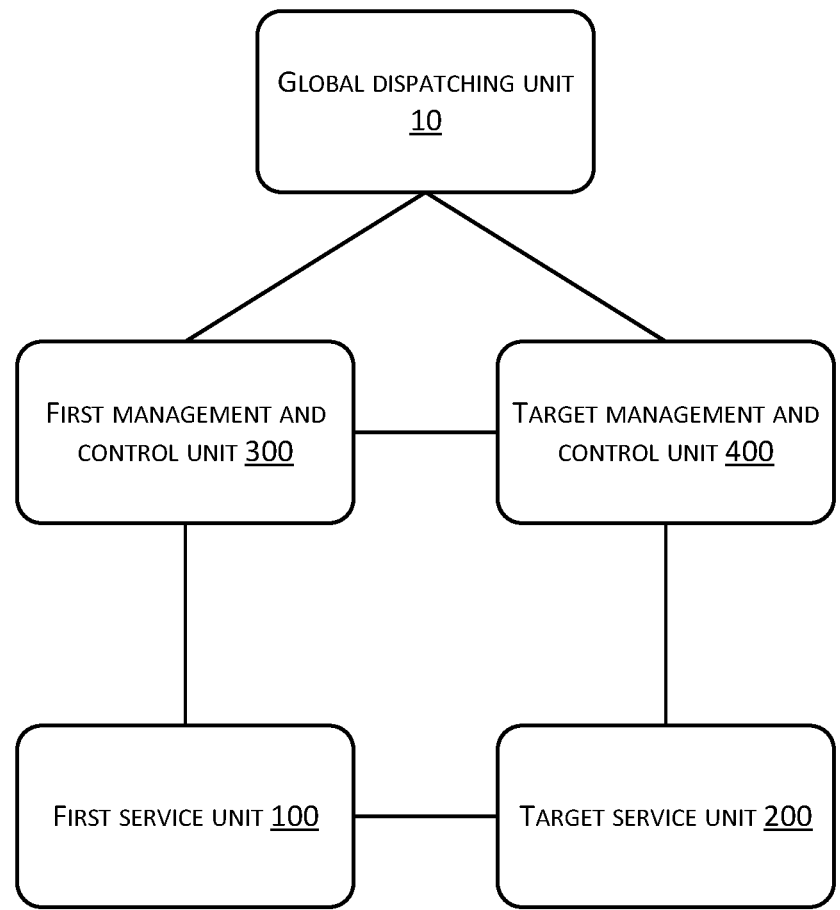
FIG. 6 is a structural block diagram of a service unit switching system provided by another embodiment of the present disclosure.

Furthermore, as shown in FIG. 6, the above system further includes: a global dispatching unit 10 separately connected to a plurality of management and control units, and the plurality of management and control units include the first management and control unit 300 and the target management and control unit 400.

The global dispatching unit 10 is configured to send information to be migrated to the first management and control unit 300, so that the first management and control unit 300 determines the first service unit 100 and the first load balancing task and the target service unit 200 based on the information to be migrated.

The information to be migrated is determined by the global management and control unit 10 according to operating conditions of multiple service units, and the multiple service units include the first service unit 100 and the target service unit 200.

The information to be migrated includes a virtual service address configured by the first service unit for the first load balancing task and a service address of the target service unit 200.

Details of workflows of and signaling interactions between various components of the service unit switching system provided by the embodiments of the present disclosure, such as the first service unit, the target service unit, and the first management and control unit, the target management and control unit, and the global dispatching unit will be further described in the following embodiments.

Figure 3:
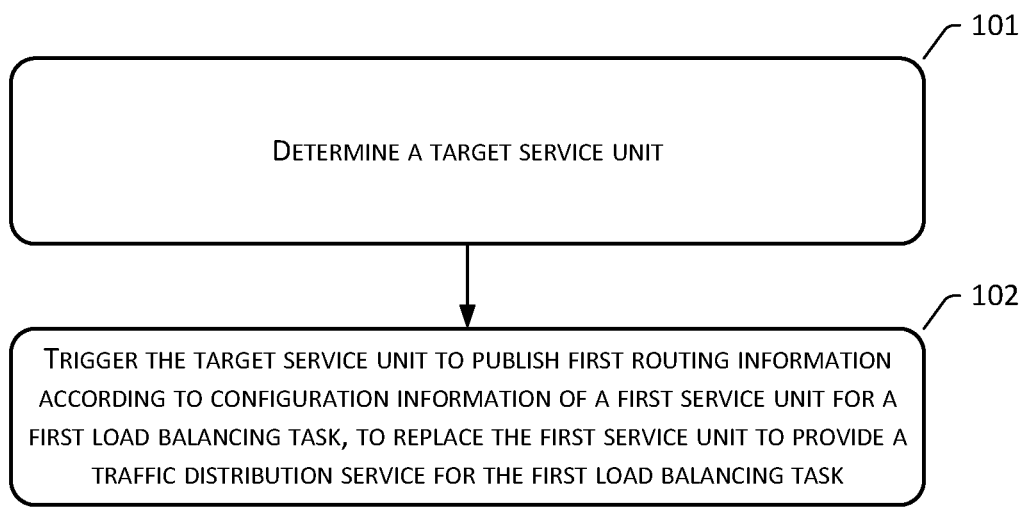
FIG. 3 is a schematic flowchart of a service unit switching method provided by another embodiment of the present disclosure.

FIG. 3 shows a schematic flowchart of a communication method provided by an embodiment of the present disclosure. An execution subject of this method may be the first management and control unit 300 of the service unit switching system in FIG. 1, and may also be the first management and control unit 300 or the target management and control unit 400 in FIG. 2. As shown in FIG. 1, the method includes:

101: Determine a target service unit.

102: Trigger the target service unit to publish first routing information according to configuration information of a first service unit for a first load balancing task, to replace the first service unit to provide a traffic distribution service for the first load balancing task.

In 101 above, multiple service units may exist in the entire load balancing network, and the target service unit can be determined from other service units except the first service unit from among the multiple service units. For example, a service unit is randomly selected, or a service unit which current total flow is lower than a flow threshold is selected as the target service unit.

The target service unit may be a second service node or a cluster composed of multiple second service nodes. It should be noted that each second service node in the cluster can provide the same traffic distribution service function for the first load balancing task, wherein the second service node can be understood as a real server.

In 102 above, the configuration information of the first service unit for the first load balancing task may include: a virtual service address VIP configured by the first service unit for the first load balancing task. The first load balancing task refers to a task of distributing service traffic for the virtual service address to multiple back-end servers corresponding to the virtual service address for processing. The traffic distribution service refers to distributing service traffic for the virtual service address to multiple back-end servers corresponding to the virtual service address. The back-end servers refer to real servers used to process service requests for the virtual service address to obtain final processing results.

In a plausible solution, triggering the target service unit to publish the first routing information according to the configuration information of the first service unit for the first load balancing task in 102 above specifically includes:

1021: Trigger the target service unit to publish the first routing information according to the virtual service address, to cause a service request for the virtual service address to be addressed to the target service unit.

The target service unit publishes the first routing information according to the virtual service address, i.e., publishes the first routing information for the virtual service address.

The first routing information corresponds to the virtual service address, and the first routing information can enable service requests for the virtual service address to be addressed to the target service unit, so that the target service unit can take over the first service unit to provide the traffic distribution service for the first load balancing task.

In practical applications, the aforementioned virtual service address corresponds to a first domain name. When a client device needs to access the first domain name, the client device first requests a DNS server to resolve the first domain name. The DNS server resolves the first domain name into the virtual service address, and a corresponding relationship between the first domain name and the virtual service address is returned to the client device for DNS caching. At the same time, the client device will send a service request for the virtual service address, and the service request can be addressed to a target service unit through first routing information issued by the target service unit. Subsequently, if the client device still wants to continue to access the first domain name, the client device will resend the service request for the above virtual service address according to the DNS caching information. In this embodiment, after the target service unit takes over the first service unit to provide a first load balancing task to provide a traffic distribution service, since the target service unit also publishes the first routing information for the above virtual service address, the client device continues to send a service request for the aforementioned virtual service address according to the DNS cache content, and the service request can be addressed to the target service unit.

In practical applications, the target service unit can locally complete configuration of the first load balancing task according to the configuration information of the first service unit for the first load balancing task, that is, the configuration information of the target service unit for the first load balancing task is consistent with the configuration information of the first service unit for the first load balancing task. In other words, the virtual service address configured by the target service unit for the first load balancing task is the same as the virtual service address configured by the first service unit for the first load balancing task.

Generally, the configuration information may also include: one or more of virtual service port(s), dispatching algorithm(s), service addresses of multiple back-end servers corresponding to the virtual service address, ports of the multiple back-end server, and health detection configuration information of the back-end servers. The target service unit may perform health detection on the multiple back-end servers according to the health detection configuration information. The target service unit can also distribute the service traffic related to the first load balancing task to the multiple back-end servers corresponding to the virtual service address according to a dispatching algorithm. Specifically, service requests for the virtual service address are distributed to the multiple back-end servers corresponding to the virtual service address according to the dispatching algorithm.

The first service unit may be a first service node, or a cluster composed of multiple first service nodes. It should be noted that each first service node in the cluster can provide the same traffic distribution service function for the first load balancing task, wherein a first service node can be understood as a real server.

In this embodiment, the first load balancing task is transferred from the first service unit to the target service unit without changing the virtual service address corresponding to the first load balancing task. In this way, even if there is a DNS cache on the client, it does not affect the real-time switching of service traffic.

In practical applications, before the target service unit publishes the first routing information, the first service unit has already published second routing information for the virtual service address. In order to ensure that the service requests for the virtual service address are addressed to the target service unit instead of the first service unit, the following two methods can be used for implementations:

First Method: Triggering the target service unit to publish the first routing information according to the virtual service address in 1021 above can be specifically implemented by using the following steps:

S11: Obtain second routing information that the first service unit has published for the virtual service address.

S12: Send the second routing information to the target service unit to trigger the target service unit to publish the first routing information having a priority higher than that of the second routing information according to the virtual service address and the second routing information.

Specifically, the priority of the first routing information needs to be higher than that of the second routing information that the first service unit has published for the virtual service address.

In an example, the above-mentioned first routing information may be BGP (Border Gateway Protocol) routing information, and an as-path attribute in the first routing information can be set (for example, setting a second as-path attribute in the first routing information to be shorter than that of a first as-path attribute in the second routing information) to realize that the priority of the first routing information is higher than the priority of the second routing information.

In another example, the first routing information includes network segment information about the virtual service address, and a degree of granularity of the network segment information in the first routing information is finer than a degree of granularity of the network segment information in the second routing information. For example, the network segment information in the second routing information is 1.1.1.0/24, and the network segment information in the first routing information is 1.1.1.0/25 and 1.1.1.128/25, wherein the larger the number after the symbol "I" in the network segment, the finer the degree of granularity and the higher the priority of the routing information.

All the second service nodes in the target service unit publish first routing information of the same priority, to implement load balancing of the service traffic through ECMP (Equal-Cost Multipath Routing) among the second service nodes.

In practical applications, other methods may also be used to implement that the priority of the first routing information is higher than the priority of the second routing information, which is not specifically limited in the embodiments of the present disclosure.

The target service unit publishes the first routing information, which can be understood as the target service unit sending the first routing information to a network device of a previous level.

Second Method: Trigger the first service unit to withdraw the second routing information before the target service unit publishes the first routing information.

In the second method, the problem of the losses or omissions of related service request packets is likely to occur during the period of time after the second routing information is withdrawn and before the first routing information is published. Therefore, in practical applications, the first method can be used. In the first method, the second routing information does not need to be revoked or can be revoked after the first route information is published. This can realize seamless switching and avoid the problems such as losses or omissions of service request packets, etc. In the technical solutions provided by the embodiments of the present disclosure, a first service unit first provides a traffic distribution service for a first load balancing task. When the entire service network needs to perform disaster tolerance switching and capacity dispatching, a target service unit publishes first routing information according to configuration information of the first service unit for the first load balancing task, and the traffic related to the first load balancing task can then be diverted to the target service unit, so that the target service unit replaces the first service unit to provide the traffic distribution service for the first load balancing task. As can be seen, when the entire service network needs to perform disaster tolerance switching and capacity dispatching, the method provided in the embodiments of the present disclosure can ensure the real-time performance of traffic switching related to the first load balancing task, and avoid the problem of relatively poor real-time performance of traffic switching caused by the influence of DNS caching in the existing technologies.

As the first service unit has already provided the traffic distribution service related to the first load balancing task before the target service unit takes over the first service unit to provide the traffic distribution service related to the first load balancing task, some connections have been established through the first service unit. Source addresses (i.e., access requester IP addresses), source ports (i.e., access request ports), target address (i.e., the virtual service address), target ports (i.e., virtual service ports) and other attributes corresponding to these connections have no change before and after the target service unit takes over the first service unit in the foregoing embodiments. Therefore, these established connections can be used normally.

These established connections can be understood as connections that the access requesters (for example, user clients) have established with the back-end servers through the first service unit. Generally, an access requester needs to continuously send multiple access requests for a functional requirement (for example: a computing requirement). These multiple access requests ought to be sent to the same back-end server, and the same back-end server performs related processing to ensure the completion of this functional requirement. If these multiple access requests are sent to different back-end servers, the functional requirement will not be fulfilled. In order to ensure the successful handover of those established connections, it is necessary to send session information about the first load balancing task that is recorded on the first service unit to the target service unit. As such, the target service unit can make reference thereto when distributing service requests related to an established connection, to distribute the service requests related to the established connection to the correct back-end server to avoid damage to the bandwidth resources of the established connection. Specifically, the above method may further include:

103: Send a session sending instruction to the first service unit to trigger the first service unit to send recorded session information about the first load balancing task to the target service unit, to allow the target service unit to make reference thereto when distributing service requests related to established connections.

The session information includes connection information of the established connections established through the first service unit. The session sending instruction may specifically be a session synchronization instruction to trigger the first service unit to synchronize the session information to the target service unit.

In an example, connection information of an established connection may include: an access requester IP address, an access requester port, a virtual service address, a virtual service port, a back-end server IP address, a the back-end server service port related to the established connection, etc.

In this way, when the target service unit subsequently receives an access request, if an access requester IP address included in the access request is located in the session information, the access request is distributed to a back-end server corresponding to a back-end server IP address that is recorded and corresponds to the access requester IP address in the session information. In this way, a service request related to the established connection can be distributed to a correct back-end server to avoid damage to the bandwidth resources of the established connection.

In specific implementation, in the architecture of the service unit switching system as shown in FIG. 1, after completing related configuration of the first load balancing task, the target service unit can send configuration completion information to the first management and control unit. After receiving the configuration completion information, the first management and control unit sends a session sending instruction to the first service unit.

In the architecture of the service unit switching system as shown in FIG. 2, after completing related configuration of the first load balancing task, the target service unit sends configuration completion information to the target management and control unit. The target management and control unit forwards the configuration completion information to the first management and control unit. After receiving the configuration completion information, the first management and control unit sends a session sending instruction to the first service unit.

When the target service unit is a cluster composed of a plurality of second service nodes, sending the session sending instruction to the first service unit to trigger the first service unit to send the recorded session information about the first load balancing task to the target service unit in 103 above specifically includes: sending the session sending instruction to the first service unit to trigger the first service unit to send the recorded session information about the first load balancing task to a target service node of the plurality of second service nodes, and allowing the target service node to synchronize the session information with the other second service nodes of the plurality of second service nodes.

Generally, the first service unit and the target service unit are not in the same multicast domain, and need to perform sending by unicasting. The plurality of second service nodes in the target service unit are located in the same multicast domain, and so can be synchronized by multicasting. Specifically, the first service unit may send the recorded session information about the first load balancing task to the target service node of the plurality of second service nodes through a three-layer unicast network. The target service node may synchronize the session information to other second service nodes of the plurality of second service nodes through a three-layer multicast network.

Furthermore, triggering the target service unit to publish the first routing information according to the configuration information of the first service unit for the first load balancing task in 102 above can be specifically implemented by using the following steps:

S21: Obtain configuration information of the first service unit for the first load balancing task.

S22. Send the configuration information to the target service unit, so that the target service unit completes configuration according to the configuration information, and publishes the first routing information according to the configuration information.

In this embodiment, there is no need to repeatedly configure load balancing tasks on multiple service units for the same domain name in advance, which can avoid technical issues in the existing technologies such as, requiring to repeatedly configure load balancing tasks in multiple different computer rooms using multiple different VIPs for the same domain name in advance, occupying configuration spaces, and wasting resources, etc.

When the structure of the service unit switching system is as shown in FIG. 1, the first management and control unit can directly send the configuration information to the target service unit.

When the structure of the service unit switching system is as shown in FIG. 2, sending the configuration information to the target service unit in S22 above specifically includes: sending the configuration information to the target management and control unit corresponding to the target service unit, so that the target management and control unit forwards the configuration information to the target service unit.

What needs to be added is that when the target service unit is a cluster composed of a plurality of second service nodes, the first management control unit or the target management control unit needs to send the configuration information to each of the plurality of second service nodes.

In practical applications, switching between service units can be triggered manually. For example, when noticing that a service unit is overloaded, a staff member can send a switching instruction to a management and control unit corresponding to the service unit to enable another service unit to take over such service unit to provide traffic distribution services for a load balancing task on that service unit. In an automated application scenario, it is possible to determine whether a switching operation needs to be performed according to operating conditions of all service units in the entire load balancing network. Specifically, the above method may further include:

104: Determine the first service unit, the first load balancing task, and the target service unit according to information to be migrated.

The information to be migrated is determined according to detected operating conditions of multiple service units. The multiple service units include the first service unit and the target service unit. The information to be migrated includes a virtual service address configured by the first service unit for the first load balancing task and a service address of the target service unit (that is, an IP address of the target service unit).

The first management and control unit can determine the first service unit configured with the virtual service address and the first load balancing task according to the virtual service address in the information to be migrated, and the target service unit can be determined according to the service address in the information to be migrated.

The information to be migrated may be detected by the first management and control unit itself, or determined by the global dispatching unit according to the detected operating conditions of the multiple service units. Specifically, the above method may further include:

105: Receive the information to be migrated that is determined by the global dispatching unit according to the detected operating conditions of the multiple service units.

The operating conditions include: a total traffic that is currently undertaken, a total success rate of connections, and/or abnormal alarm information.

For example, the global dispatching unit may determine a service unit whose total traffic currently undertaken exceeds a preset threshold as the first service unit; and determine a load balancing task with the largest traffic proportion on the first service unit as the first load balancing task. A service unit whose total traffic currently undertaken is lower than the preset threshold is determined as the target service unit. For another example, the global dispatching unit may determine a service unit whose current total success rate of connections is lower than a first preset success rate as the first service unit, and determine a load balancing task with the lowest success rate of connections on the first service unit as the first load balancing task. A service unit whose current total traffic is lower than a preset threshold and whose total success rate of connections is higher than a second preset success rate is determined as the target service unit. For another example, the global dispatching unit may determine a service unit that issued abnormal alarm information as the first service unit.

The global dispatching unit may use the virtual service address configured by the first service unit for the first load balancing task and the service address of the target service unit that are determined as the information to be migrated.

After the target service unit takes over the first service unit to provide the traffic distribution service for the first load balancing task, the first service unit can revoke the second routing information that has been published thereby for the first load balancing task. Specifically, the above method may further include:

106: Trigger the first service unit to cancel the second routing information that has been published for the first load balancing task after receiving a publishing notification of the first routing information.

The above-mentioned virtual service address may be included in the publishing notification.

When the execution subject of the above method is the first management and control unit in FIG. 1, the first management and control unit sends a route cancellation instruction to the first service unit after receiving the publishing notification sent by the target service unit to trigger the first service unit to revoke the second routing information that it has published for the first load balancing task.

When the execution subject of the above method is the first management and control unit in FIG. 2, the first management and control unit sends a route cancellation instruction to the first service unit to trigger the first service unit to revoke the second routing information that it has published for the first load balancing task, after receiving the published notice forwarded by the target management and control unit.

When the execution subject of the above method is the target management and control unit in FIG. 2, the target management and control unit forwards the publishing notification to the first management and control unit after receiving the publishing notification sent by the target service unit, so that the first management control unit, after receiving the publishing notification, triggers the first service unit to revoke the second routing information that it has published for the first load balancing task.

In addition, considering that the number of configurations that can be carried by each service unit is limited, in order not to affect configurations of the first service unit for other new load balancing tasks, the first service unit can be triggered to delete the configuration related to the first load balancing task. Specifically, the above method may further include:

107: Trigger the first service unit to delete the configuration related to the first load balancing task after receiving the publishing notification related to the first route information.

When the execution subject of the above method is the first management and control unit in FIG. 1, the first management and control unit sends a configuration deletion instruction to the first service unit after receiving the publishing notification sent by the target service unit to trigger the first service unit to revoke the second routing information that it has published for the first load balancing task.

When the execution subject of the above method is the first management and control unit in FIG. 2, after receiving the publishing notification forwarded by the target management and control unit, the first management and control unit sends a configuration deletion instruction to the first service unit to trigger the first service unit to delete the configuration related to the first load balancing task.

When the execution subject of the above method is the target management and control unit in FIG. 2, after receiving the publishing notification sent by the target service unit, the target management and control unit forwards the publishing notification to the first management and control unit, so that the first management and control unit, after receiving the publishing notification, triggers the first service unit to delete the configuration related to the first load balancing task.

Furthermore, the above method may also include:

108: Receive detection information that is detected by the target service unit for the first load balancing task.

109: Determine whether the target service unit satisfies a takeover condition according to the detection information.

110: Perform the step of triggering the target service unit to publish the first routing information according to the configuration information of the first service unit for the first load balancing task when the target service unit satisfies the takeover condition.

When the execution subject of the above method is the first management and control unit in FIG. 1, the first management and control unit may directly receive the detection information sent by the target service unit. The first management and control unit may send a route publishing instruction to the target service unit to trigger the target service unit to publish the first route information according to the configuration information.

When the execution subject of the above method is the target management and control unit in FIG. 2, the target management and control unit can directly receive the detection information sent by the target service unit. The target management and control unit may send a route publishing instruction to the target service unit to trigger the target service unit to publish the first route information according to the configuration information.

In this embodiment, determining whether the target service unit satisfies the takeover condition based on the detection information can ensure that the target service unit can provide the traffic distribution service normally after taking over the first service unit and ensure the effectiveness of switching.

It should be noted that health detection results of multiple back-end servers by different service units are likely to be different. The reason for such difference may be due to whether a detection interface of a back-end server in a service unit is normal. If a problem with a detection interface exists, a detection result of a target service unit shows that a health status of a back-end server is abnormal. In this way, the target service unit will automatically ignore the back-end server in an abnormal status when subsequent traffic distribution is performed. Once the number of back-end servers automatically ignored is large, this will lead to: the load balancing network becoming difficult to provide reliable load balancing services for the first load balancing task based on the target service unit, after the target service unit takes over the first service unit.

The detection information may include: first health status information obtained by the target service unit through detection of multiple back-end servers, wherein the multiple back-end servers are used to process service requests related to the first load balancing task. The service requests related to the first load balancing task are also service requests directed to the virtual service address configured by the first service unit for the first load balancing task. As described in the foregoing embodiments, the configuration information includes: health detection configuration information of back-end server(s), to enable the target service unit to detect health status of the multiple back-end servers according to the health detection configuration information.

In a plausible solution, determining whether the target service unit satisfies the takeover condition according to the detection information in 109 above specifically includes:

1091: Determine whether the target service unit satisfies the takeover condition according to first health status information.

In an example, if the first health status information shows that health statuses of more than a preset number of back-end servers among the multiple back-end servers are normal, a determination can be made that the target service unit satisfies the takeover condition. For example, there are 10 back-end servers, and the preset number is 8.

In another example, second health status information obtained by the first service unit by detecting the multiple back-end servers is obtained. A determination is made that the target service unit satisfies the takeover condition when a difference between the first health status detection information and the second health status detection information satisfies a first preset condition.

As described in the foregoing embodiments, the configuration information includes: the health detection configuration information of the back-end server(s), to enable the first service unit to detect health statuses of multiple end servers related to the first load balancing task according to the health detection configuration information.

For example, the first health status detection information shows that n back-end servers among multiple back-end servers are normal, and the second health status detection information shows that m back-end servers are normal among the multiple back-end servers. When an absolute value of a difference between m and n is smaller than a preset difference, a determination is made that the difference between the first health state detection information and the second health state detection information satisfies the first preset condition.

In this way, for the first load balancing task, the load balancing network based on the target service unit can provide the same and reliable load balancing service as that based on the first service unit.

Furthermore, the target service unit is a cluster composed of a plurality of second service nodes; the detection information further includes: an amount of synchronization of session information between the plurality of second service nodes related to the first load balancing task. The session information is recorded by the first service unit when providing the traffic distribution service for the first load balancing task. Determining whether the target service unit satisfies the takeover condition according to the first health status information in 1091 above specifically includes:

S31: Determine whether the target service unit satisfies the takeover condition according to the first health status information and the amount of synchronization.

The amount of synchronization of session information can be understood as an amount of synchronization of established connections. For example, if the total number of established connections is 1000, and the number of established connections that have been synchronized is 900, the amount of synchronization is 900.

Determining whether the target service unit satisfies the takeover condition according to the first health status information and the amount of synchronization in S31 above can be specifically implemented by using the following steps:

a. Obtain second health status information obtained by the first service unit through detection of the multiple back-end servers.

b. Determine whether a difference between first health state detection information and the second health state detection information satisfies a first preset condition.

c. Determine a proportion of an amount of synchronization of session information in a total amount of session information.

d. Determine that the target service unit satisfies the takeover condition when the difference satisfies the first preset condition and the proportion is greater than a preset proportion.

The preset proportion can be set to 95%, which is not specifically limited in the embodiments of the present disclosure.

Details of implementations of the foregoing steps a and b, reference can be made to corresponding content in the foregoing embodiments, and details thereof are not described herein again. The proportion being greater than the preset proportion ensures that most of the traffic of the established connections can be switched normally.

In summary, dynamic switching of traffic between two service units is achieved by publishing higher priority routes, and synchronization of load balancing of session information is achieved between load balancing networks through a solution of a three-layer unicast network and a three-layer multicast network.. This solution solves two shortcomings of the DNS domain name switching solutions in the existing technologies. First, the real-time performance of traffic switching can be guaranteed. After a first route of a target service unit is published, the core network will automatically learn a new routing path and perform switching through a routing protocol. Second, in this solution, since a virtual service address VIP does not change when switching, and all session information is synchronized through a three-layer network, normal forwarding of established connections is ensured, and new connections will not be affected in any way, thus achieving a migration of service traffic of a load balancing system in a computer room without perception and disruption.

Figure 4:
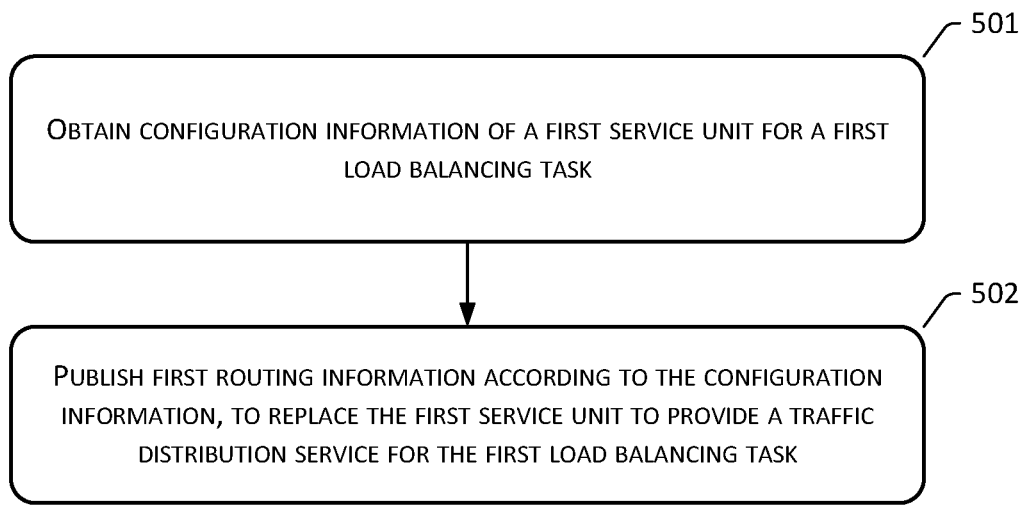
FIG. 4 is a schematic flowchart of a service unit switching method provided by an embodiment of the present disclosure.

FIG. 4 shows a schematic flowchart of a service unit switching method provided by another embodiment of the present disclosure. An execution subject of the method provided in the embodiments of the present disclosure may be the target service unit in the foregoing embodiments. The method includes:

501: Obtain configuration information of a first service unit for a first load balancing task.

502: Publish first routing information according to the configuration information, to replace the first service unit to provide a traffic distribution service for the first load balancing task.

Based on the architecture of the service unit switching system as shown in FIG. 1, the first management and control unit can obtain configuration information of the first service unit for the first load balancing task from a local storage or from the first service unit, and send the configuration information to the target service unit.

Based on the architecture of the service unit switching system as shown in FIG. 2, the first management and control unit can obtain configuration information of the first service unit for the first load balancing task from a local storage or from the first service unit, and send the configuration information to the target management and control unit, the target management and control unit sends the configuration information to the target service unit.

For details of implementation processes of the foregoing 501 and 502, reference can be made to corresponding content in the foregoing embodiments, and the details thereof are not described herein again.

In the technical solutions provided by the embodiments of the present disclosure, a first service unit first provides a traffic distribution service for a first load balancing task. When the entire service network needs to perform disaster tolerance switching and capacity dispatching, a target service unit publishes first routing information according to configuration information of the first service unit for the first load balancing task, and the traffic related to the first load balancing task can then be diverted to the target service unit, so that the target service unit replaces the first service unit to provide the traffic distribution service for the first load balancing task. As can be seen, when the entire service network needs to perform disaster tolerance switching and capacity dispatching, the method provided in the embodiments of the present disclosure can ensure the real-time performance of traffic switching related to the first load balancing task, and avoid the problem of relatively poor real-time performance of traffic switching caused by the influence of DNS caching in the existing technologies.

Furthermore, publishing the first routing information according to the configuration information in 502 above can be specifically implemented by using the following steps:

5021: Obtain second routing information that has been published by the first service unit for the first load balancing task.

5022: Publish the first routing information with a higher priority than the second routing information according to the configuration information and the second routing information.

Based on the architecture of the service unit switching system as shown in FIG. 1, the target service unit can obtain the second routing information from the first management and control unit.

Based on the architecture of the service unit switching system as shown in FIG. 2, the first management and control unit can send the second routing information to the target management and control unit, and the target management and control unit forwards the second routing information to the target service unit.

For details of implementations of the foregoing steps 5021 and 5022, reference may be made to corresponding content in the foregoing embodiments, and the details thereof are not described herein again.

Furthermore, the above method may also include:

503: Receive session information about the first load balancing task from the first service unit.

504: Synchronize the session information to other second service nodes in a cluster.

Each second service node in the cluster is used to provide a traffic distribution service for the first load balancing task.

In this embodiment, the target service unit is a cluster composed of multiple second service nodes, and the execution subject of the above method is a second service node in the multiple second service nodes.

In addition, it should be noted that in the foregoing embodiments, the first service unit may also be a cluster composed of a plurality of first service nodes. The plurality of first service nodes use a session synchronization method, and each service node stores session information related to the first load balancing task. A first service node among the plurality of first service nodes may send session information related to the first load balancing task to a target service node among the multiple second service nodes. The target service node synchronizes the session information to other second service nodes among the multiple second service nodes. For example, the target service node can synchronize the session information to other second service nodes of the multiple second service nodes through a three-layer multicast network.

Furthermore, the above method may also include:

505: Send detection information for the first load balancing task to a target management and control unit, so that the target management and control unit determines whether a takeover condition is satisfied according to the detection information.

506: Execute the step of publishing the first routing information according to the configuration information after receiving a takeover instruction sent by the target management and control unit upon determining that the takeover condition is satisfied.

Details of implementations of the foregoing steps 505 and 506, reference may be made to corresponding content in the foregoing embodiments, and the details thereof are not described herein again.

It needs to be explained herein that the content of each step in the method provided in the embodiments of the application that is not described in detail can be referred to corresponding content in the foregoing embodiments, and will not be repeated herein. In addition, the method provided in the embodiments of the present disclosure may also include other steps or all the steps in the foregoing embodiments, in addition to the foregoing steps. For details, reference can be made to corresponding content of the foregoing embodiments, which will not be repeated herein.

Figure 5:
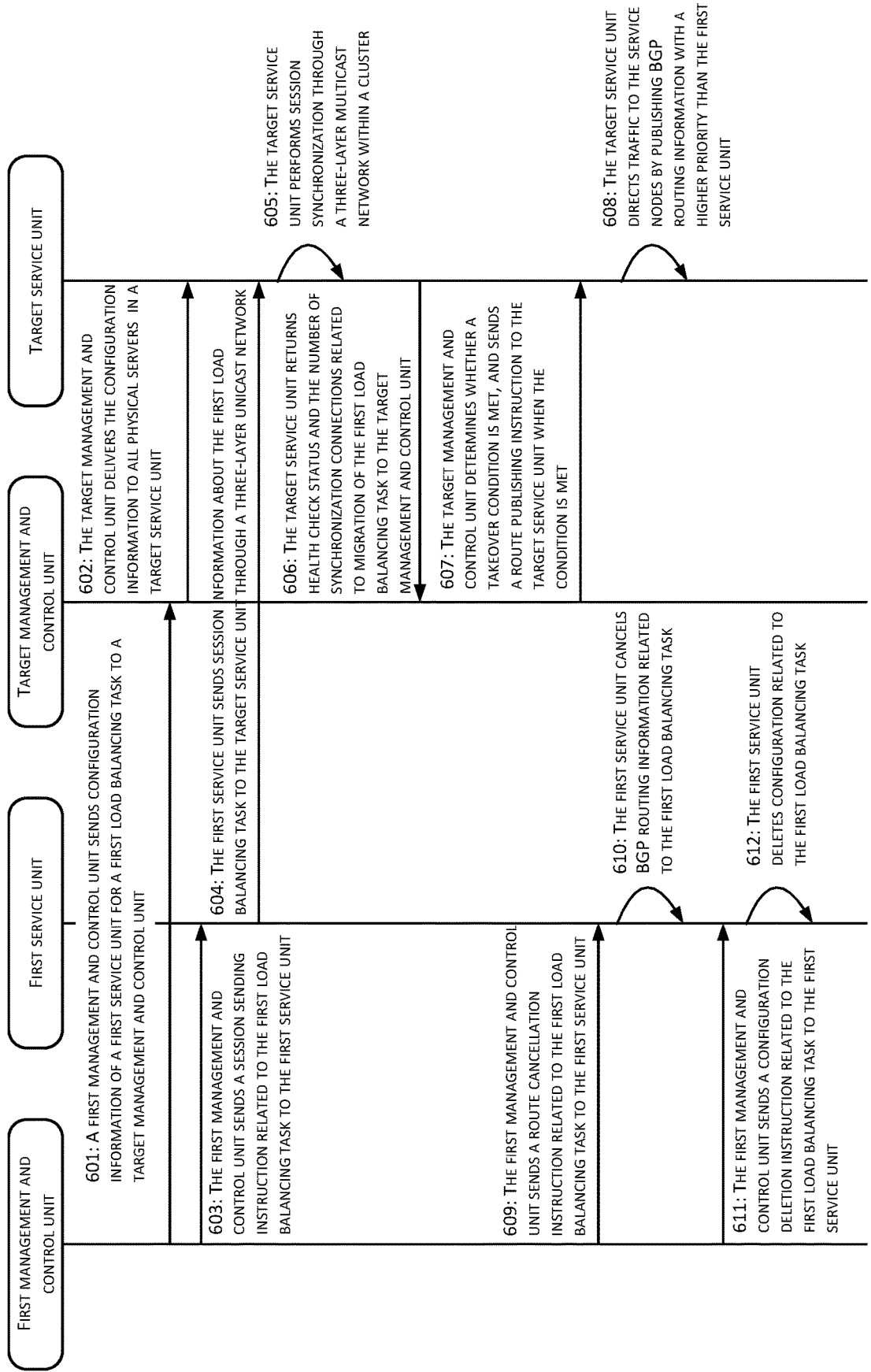
FIG. 5 is a signaling diagram provided by an embodiment of the present disclosure.

The technical solutions provided by the embodiments of the present disclosure will be introduced below in conjunction with a signaling diagram shown in FIG. 5 based on the architecture of the service unit switching system as shown in FIG. 2.

601: A first management and control unit sends configuration information of a first service unit for a first load balancing task to a target management and control unit.

602: The target management and control unit delivers the configuration information to all physical servers (that is, second service nodes) in a target service unit.

603: The first management and control unit sends a session sending instruction related to the first load balancing task to the first service unit.

604: The first service unit sends session information about the first load balancing task to the target service unit through a three-layer unicast network.

605: The target service unit performs session synchronization through a three-layer multicast network within a cluster.

A target service unit is composed of multiple physical servers (that is, second service nodes). Through session synchronization, each physical server has full connection information about the first load balancing task, that is, full connection information of corresponding VIP about the first load balancing task.

606: The target service unit returns health check status and the number of synchronization connections (that is, an amount of synchronization) related to migration of the first load balancing task to the target management and control unit.

607: The target management and control unit determines whether a takeover condition is met, and sends a route publishing instruction to the target service unit when the condition is met.

608: The target service unit directs traffic to the service nodes by publishing BGP routing information with a higher priority than the first service unit.

All physical servers in the target service unit publish the same BGP routing information, so that the traffic is load balanced through ECMP equal-cost routing among the service nodes.

609: The first management and control unit sends a route cancellation instruction related to the first load balancing task to the first service unit.

610: The first service unit cancels BGP routing information related to the first load balancing task.

611: The first management and control unit sends a configuration deletion instruction related to the first load balancing task to the first service unit.

612: The first service unit deletes configuration related to the first load balancing task.

In this embodiment, a target service unit replaces a first service unit to provide services, and through synchronized connection information, an established connection is ensured to be correctly converted when passing through the load balancing system, and the traffic is sent to a correct back-end server.

Figure 10:
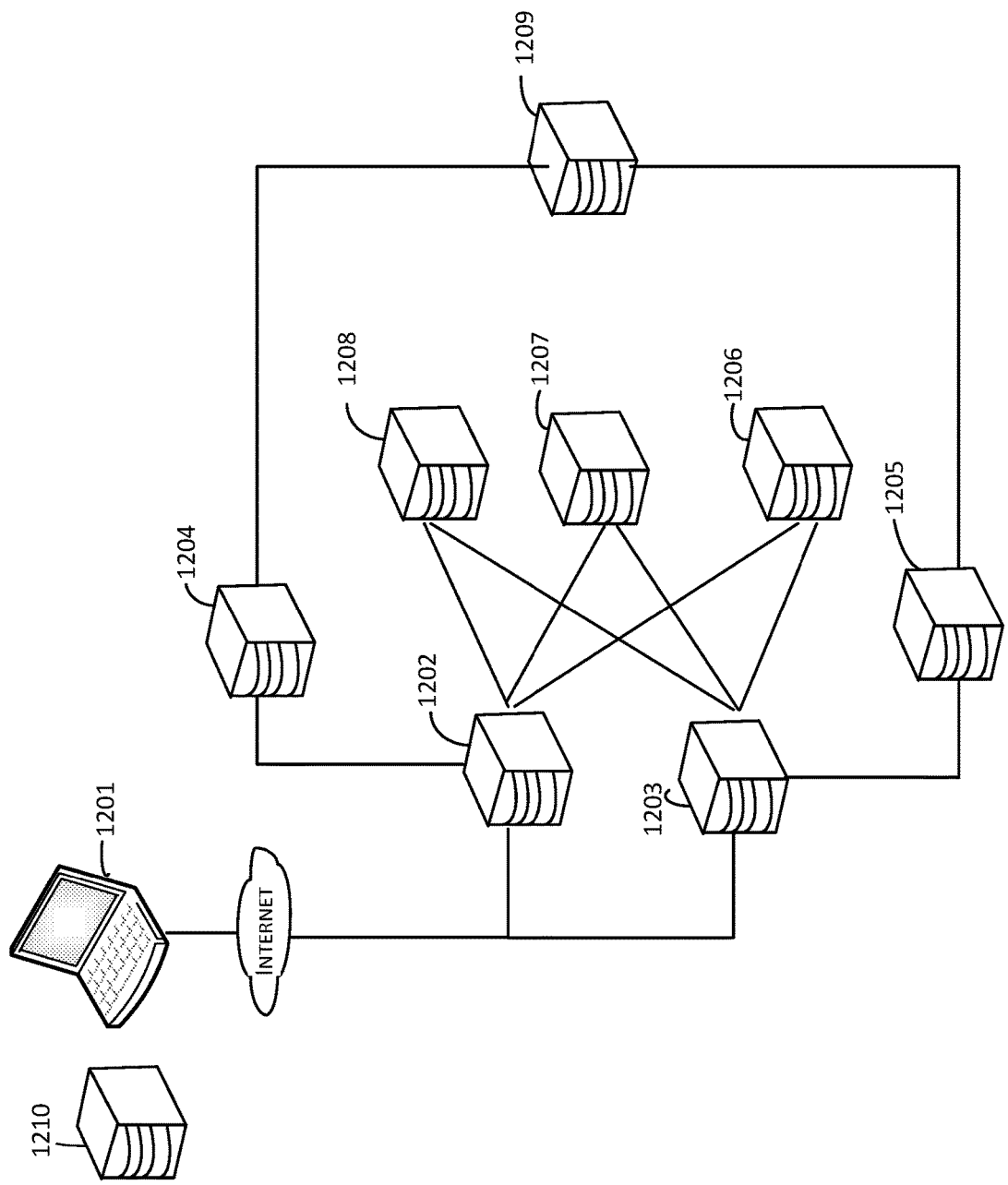
FIG. 10 is a network architecture diagram provided by another embodiment of the present disclosure.

FIG. 10 shows a network architecture diagram provided by an embodiment of the present disclosure. A switching method provided by the embodiments of the present disclosure will be described in detail below in conjunction with FIG. 10:

At the beginning, a first load balancing device 1202 (that is, the above-mentioned first service unit) publishes second routing information to the Internet for a VIP. A client device 1201 sends a resolution request for a domain name to a DNS server 1210. The DNS server 1210 resolves the domain name to obtain the VIP, and returns the VIP to the client device 1201 for DNS caching. The client device 1201 sends a service request carrying the VIP to the Internet according to a DNS cache. Since the first load balancing device 1202 currently publishes the second routing information to the Internet for the VIP, the service request can be addressed to the first load balancing device 1202. The first load balancing device 1202 distributes the service request to one of a first back-end server 1208, a second back-end server 1207, and a third back-end server 1206 according to a dispatching algorithm to process the service request.

A first management and control device 1204 (that is, the above-mentioned first management and control unit) can report operations of the first load balancing device 1202 to a global dispatching device 1209 (that is, the above-mentioned global dispatching unit), and the target management and control device 1205 (that is, the above-mentioned target management and control unit) can report an operating status of a second load balancing device 1203 (that is, the above-mentioned target service unit) to the global dispatching device 1209 (that is, the above-mentioned global dispatching unit). The global dispatching device 1209 can determine whether switching between the first load balancing device and the second load balancing device is needed based on information reported by the first management and control device 1204 and the target management and control device 1205. If needed, the global dispatching device 1209 may notify the first management and control device 1204, so that the first management and control device 1204 sends configuration information of the first load balancing device 1202 for the VIP to the target management and control device 1205. The target management and control device 1205 sends the configuration information to the second load balancing device 1203. The second load balancing device 1203 performs configuration according to the configuration information, and publishes first routing information to the Internet for the VIP, and a priority of the first routing information is higher than that of the second routing information.

When the Internet subsequently receives a service request carrying the VIP from the client device 1201 again, the service request is addressed to the second load balancing device 1203. The second load balancing device 1203 distributes the service request to one of the first back-end server 1208, the second back-end server 1207, and the third back-end server 1206 for processing the service request.

As can be seen, in the embodiments of the present disclosure, a DNS server is not required to perform domain name resolution switching, thus providing a switching service for the client device without perception.

Figure 11:
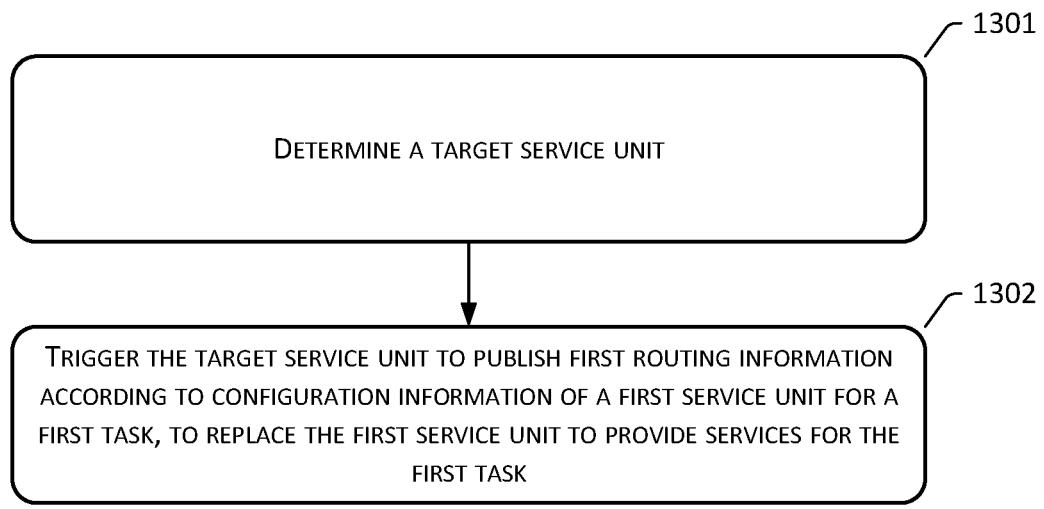
FIG. 11 is a schematic flowchart of a service unit switching method provided by another embodiment of the present disclosure.

FIG. 11 shows a schematic flowchart of a service unit switching method provided by another embodiment of the present disclosure. As shown in FIG. 11, the method includes:

1301: Determine a target service unit.

1302: Trigger the target service unit to publish first routing information according to configuration information of a first service unit for a first task, to replace the first service unit to provide services for the first task.

In 1301 above, in the entire service network, multiple service units may exist, and the target service unit can be determined from other service units that are different from the first service unit from among the multiple service units. For example, a service unit with a small load is selected as the target service unit.

In 1302 above, the first task may be a forwarding task or a load balancing task. When the first task is a load balancing task, the configuration information of the first service unit for the first task may include: a virtual service address VIP configured by the first service unit for the first task. The first task refers to a task of distributing service traffic for the virtual service address to multiple back-end servers corresponding to the virtual service address for processing. A traffic distribution service refers to a distribution of service traffic for the virtual service address to multiple back-end servers corresponding to the virtual service address. The back-end server refers to a real server used to process a service request for the virtual service address to obtain a final processing result.

When the first task is a forwarding task, the configuration information of the first service unit for the first task may include: a first IP address (Internet Protocol Address) configured by the first service unit for the first task. The first task refers to forwarding the service traffic accessing the first IP address to a processing server whose IP address is the first IP address for processing.

The target service unit may publish the first routing information according to the first IP address in the configuration information, to cause the service request for the first IP address to be addressed to the target service unit, so that the target service unit forwards the service request to a processing server whose IP address is the first IP address for processing.

When the first task is a load balancing task, details of implementations can be referenced to corresponding content in the foregoing embodiments, which will not be repeated herein.

In this embodiment, the first task is transferred from the first service unit to the target service unit without changing a destination IP address corresponding to the first task. In this way, even if there is a DNS cache on the client, it does not affect the real-time switching of service traffic.

For the content that is not detailed in the process of switching service unit for the first task in this embodiment, reference can be made to the process of switching service unit for the first load balancing task in the foregoing embodiments, which is not repeated herein.

Figure 12:
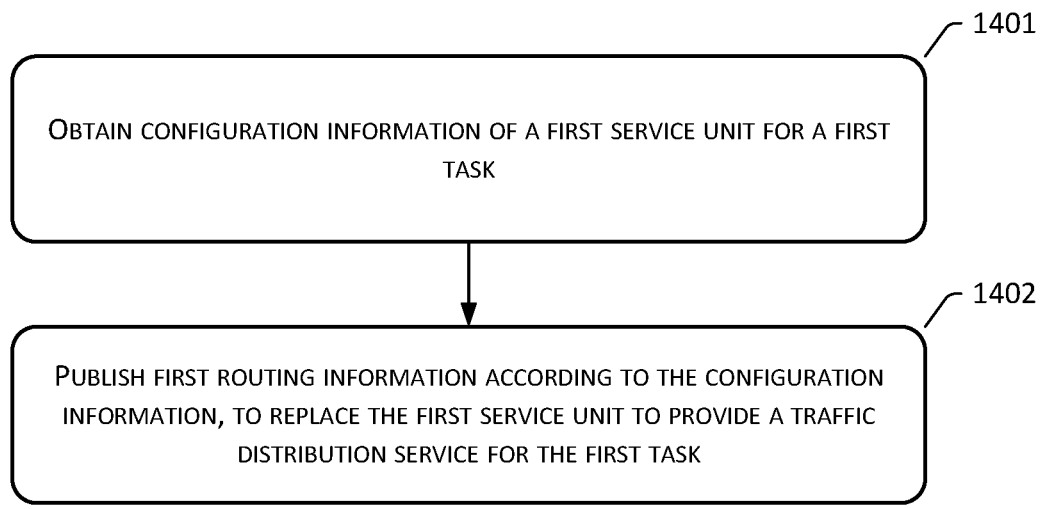
FIG. 12 is a schematic flowchart of a service unit switching method provided by an embodiment of the present disclosure.

FIG. 12 shows a schematic flowchart of a service unit switching method provided by another embodiment of the present disclosure. As shown in FIG. 12, the method includes:

1401: Obtain configuration information of a first service unit for a first task.

1402: Publish first routing information according to the configuration information, to replace the first service unit to provide services for the first task.

In 1401 above, the configuration information for the first task can be obtained from the first service unit, for example: sending an acquisition request to the first service unit; and receiving the configuration information for the first task from the first service unit.

In 1402 above, the configuration information may include a first IP address configured by the first service unit for the first task. Specifically, the first routing information may be published for the first IP address, so that the service request for the first IP address is addressed locally.

An execution subject of the method provided in the embodiments of the present disclosure may be the target service unit in the foregoing embodiments.

For details of implementation processes of the foregoing 1401 and 1402, reference can be made to corresponding content in the foregoing embodiments, and the details thereof are not described herein again.

In this embodiment, the first task is transferred from the first service unit to the target service unit without changing a destination IP address corresponding to the first task. In this way, even if there is a DNS cache on the client, it does not affect the real-time switching of service traffic.

For the content that is not detailed in the process of switching service unit for the first task in this embodiment, reference can be made to the process of switching service unit for the first load balancing task in the foregoing embodiments, which is not repeated herein.

Figure 7:
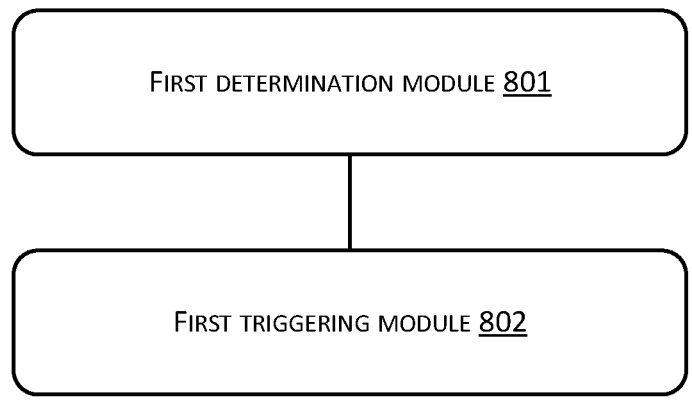
FIG. 7 is a structural block diagram of a service unit switching apparatus provided by an embodiment of the present disclosure.

FIG. 7 shows a structural block diagram of a service unit switching apparatus provided by an embodiment of the present disclosure. As shown in FIG. 7, the apparatus includes: a first determination module 801 and a first triggering module 802, wherein:

the first determination module 801 is configured to determine a target service unit; and the first triggering module 802 is configured to trigger the target service unit to publish first routing information according to configuration information of the first service unit for the first load balancing task, to replace the first service unit to provide a traffic distribution service for the first load balancing task.

Furthermore, the configuration information includes: a virtual service address configured by the first service unit for the first load balancing task;

The first triggering module 802 is specifically configured to trigger the target service unit to publish the first routing information according to the virtual service address, so that a service request for the virtual service address is addressed to the target service unit.

Furthermore, the first triggering module 802 is specifically configured to obtain second routing information that the first service unit has published for the virtual service address, the second routing information is sent to the target service unit to trigger the target service unit to publish the first routing information with a higher priority than that of the second routing information according to the virtual service address and the second routing information.

Furthermore, the first triggering module 802 is also configured to:

send a session sending instruction to the first service unit to trigger the first service unit to send recorded session information about the first load balancing task to the target service unit to enable the target service unit to make reference thereto when distributing service requests related to established connections, wherein the session information includes connection information of the established connections.

Furthermore, the target service unit is a cluster composed of multiple second service nodes;

the first triggering module 802 is specifically configured to:

send a session sending instruction to the first service unit to trigger the first service unit to send recorded session information about the first load balancing task to a target service node among the multiple second service nodes, the target service node synchronizing the session information with other second service nodes among the multiple second service nodes.

Furthermore, the first triggering module 802 is specifically configured to obtain the configuration information of the first service unit for the first load balancing task; send the configuration information to the target service unit, to enable the target service unit to complete configuration based on the configuration information, and publish the first routing information according to the configuration information.

Furthermore, the first triggering module 802 is specifically configured to send the configuration information to a target management and control unit corresponding to the target service unit, to cause the target management and control unit to forward the configuration information to the target service unit.

Furthermore, the apparatus further includes:

a first determination module configured to determine the first service unit, the first load balancing task, and the target service unit according to information to be migrated, the information to be migrated being determined according to detected operating conditions of multiple service units, and the multiple service units including the first service unit and the target service unit;

the information to be migrated including a virtual service address configured by the first service unit for the first load balancing task and a service address of the target service unit.

Furthermore, the apparatus further includes:

a first receiving module configured to receive the information to be migrated that is sent and determined by a global dispatching unit according to the detected operating conditions of the multiple service units.

Furthermore, the operating conditions include: a total traffic currently undertaken, a total success rate of connections, and/or abnormal alarm information.

Furthermore, the apparatus further includes:

a second receiving module configured to trigger the first service unit to cancel the second routing information that has been published for the first load balancing task after receiving a publishing notification about the first routing information.

Furthermore, the apparatus further includes:

a third receiving module configured to trigger the first service unit to delete configuration related to the first load balancing task after receiving the publishing notification related to the first routing information.

In the technical solutions provided by the embodiments of the present disclosure, a first service unit is currently performing a first load balancing task. When the entire service network needs to perform disaster tolerance switching and capacity dispatching, configuration information of the first service unit for the first load balancing task is sent to a target service unit. The target service unit performs related configuration according to the configuration information, and publishes a first route related to the first load balancing task to divert traffic related to the first load balancing task to the target service unit. As such, the target service unit replaces the first service unit to provide a traffic distribution service related to the first load balancing task. As can be seen, when the entire service network needs to perform disaster tolerance switching and capacity dispatching, the methods provided in the embodiment of this application can effectively improve the real-time performance of traffic switching, and avoid the problem of relatively poor real-time performance of traffic switching caused by the influence of DNS cache in the existing technologies.

It should be noted here that the service unit switching apparatuses provided in the above embodiments can implement the technical solutions described in the above method embodiments, and the principles of specific implementations of the above modules or units can be referred to corresponding content in the above method embodiments, which are not repeated herein.

Furthermore, the apparatus further includes:

a fourth receiving module configured to receive detection information detected by the target service unit for the first load balancing task;

a first judgment module configured to determination whether the target service unit satisfies a takeover condition according to the detection information;

a first execution module configured to execute the step of triggering the target service unit to publish the first routing information according to the configuration information of the first service unit for the first load balancing task when the target service unit satisfies the takeover condition.

Furthermore, the detection information includes: first health status information obtained by detection of multiple back-end servers of the target service unit, wherein the multiple back-end servers are used to process service requests related to the first load balancing task; and the first judgment module is specifically configured to:

determine whether the target service unit satisfies the takeover condition according to the first health status information.

Furthermore, the target service unit is a cluster composed of multiple second service nodes;

The detection information further includes: an amount of synchronization of session information related to the first load balancing task among the multiple second service nodes.

The first judgment module is specifically configured to:

determine whether the target service unit satisfies the takeover condition according to the first health status information and the amount of synchronization, the session information being recorded by the first service unit when providing the traffic distribution service for executing the first load balancing task.

Furthermore, the first judgment module is specifically configured to:

obtain second health status information that is obtained by the first service unit by detecting the multiple back-end servers;

determine whether a difference between the first health state detection information and the second health state detection information satisfies a first preset condition;

determine a proportion of the amount of synchronization in a total amount of session information; and determine that the target service unit satisfies the takeover condition when the difference satisfies the first preset condition and the proportion is greater than a preset proportion.

In the technical solutions provided by the embodiments of the present disclosure, a first service unit is currently providing a traffic distribution service for a first load balancing task. When the entire service network needs to perform disaster tolerance switching and capacity dispatching, a target service unit publishes first routing information according to configuration information of the first service unit for the first load balancing task, and the traffic related to the first load balancing task can then be diverted to the target service unit. The target service unit replaces the first service unit to provide the traffic distribution service for the first load balancing task. As can be seen, when the entire service network needs to perform disaster tolerance switching and capacity dispatching, the methods provided in the embodiments of the present disclosure can ensure the real-time performance of traffic switching related to the first load balancing task, and avoid the problem of relatively poor real-time performance of traffic switching caused by the influence of DNS caching in the existing technologies.

It should be noted here that the service unit switching apparatuses provided in the above embodiments can implement the technical solutions described in the above method embodiments, and the principles of specific implementations of the above modules or units can be referred to corresponding content in the above method embodiments, which are not repeated herein.

Figure 8:
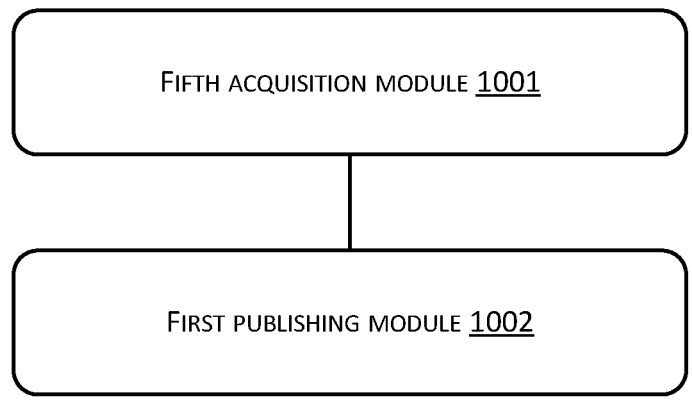
FIG. 8 is a structural block diagram of a service unit switching apparatus provided by another embodiment of the present disclosure.

FIG. 8 shows a structural block diagram of a service unit switching apparatus provided by another embodiment of the present disclosure. As shown in FIG. 8, the apparatus includes: a fifth acquisition module 1001 and a first publishing module 1002, wherein:

the fifth acquisition module 1001 is configured to receive configuration information of a first service unit for a first load balancing task; and the first publishing module 1002 is configured to publish first routing information according to the configuration information, to replace the first service unit to provide a traffic distribution service for the first load balancing task.

Further, the first publishing module 1002 is specifically configured to:

obtain second routing information that the first service unit has published for the first load balancing task; and publish the first routing information with a higher priority than the second routing information according to the configuration information and the second routing information.

Further, the apparatus further includes:

a sixth receiving module configured to receive session information about the first load balancing task sent by the first service unit;

a first synchronization module configured to synchronize the session information with other second service nodes in a cluster, each second service node in the cluster being configured to provide traffic distribution services for the first load balancing task.

Furthermore, the apparatus further includes:

a third sending module configured to send detection information detected for the first load balancing task to a target management and control unit, to enable the target management and control unit to determine whether a takeover condition is satisfied according to the detection information;

a seventh receiving module configured to perform the step of publishing the first routing information according to the configuration information after receiving a takeover instruction from the target management and control unit when the takeover condition is determined to be satisfied.

In the technical solutions provided by the embodiments of the present disclosure, the first service unit is currently providing a traffic distribution service for a first load balancing task. When the entire service network needs to perform disaster tolerance switching and capacity dispatching, a target service unit publishes first routing information according to configuration information of the first service unit for the first load balancing task, and the traffic related to the first load balancing task can then be diverted to the target service unit. The target service unit replaces the first service unit to provide the traffic distribution service for the first load balancing task. As can be seen, when the entire service network needs to perform disaster tolerance switching and capacity dispatching, the methods provided in the embodiments of the present disclosure can ensure the real-time performance of traffic switching related to the first load balancing task, and avoid the problem of relatively poor real-time performance of traffic switching caused by the influence of DNS caching in the existing technologies.

It should be noted here that the service unit switching apparatuses provided in the above embodiments can implement the technical solutions described in the above method embodiments, and the principles of specific implementations of the above modules or units can be referred to corresponding content in the above method embodiments, which are not repeated herein.

FIG. 7 shows a structural block diagram of a service unit switching apparatus provided by an embodiment of the present disclosure. As shown in FIG. 7, the apparatus includes: a first determination module 801 and a first triggering module 802, wherein:

the first determination module 801 configured to determine a target service unit;

the first triggering module 802 configured to trigger the target service unit to publish first routing information according to configuration information of a first service unit for a first task, to replace the first service unit to provide services for the first task.

In this embodiment, the first task is transferred from the first service unit to the target service unit without changing a destination IP address corresponding to the first task. In this way, even if there is a DNS cache on the client, it does not affect the real-time switching of service traffic.

It should be noted here that the service unit switching apparatuses provided in the above embodiments can implement the technical solutions described in the above method embodiments, and the principles of specific implementations of the above modules or units can be referred to corresponding content in the above method embodiments, which are not repeated herein.

FIG. 8 shows a structural block diagram of a service unit switching apparatus provided by another embodiment of the present disclosure. As shown in FIG. 8, the apparatus includes: a fifth acquisition module 1001 and a first publishing module 1002, wherein:

the fifth acquisition module 1001 configured to receive configuration information of a first service unit for a first task;

the first publishing module 1002 configured to publish first routing information according to the configuration information, to replace the first service unit to provide services for the first task.

In this embodiment, the first task is transferred from the first service unit to the target service unit without changing a destination IP address corresponding to the first task. In this way, even if there is a DNS cache on the client, it does not affect the real-time switching of service traffic.

It should be noted here that the service unit switching apparatuses provided in the above embodiments can implement the technical solutions described in the above method embodiments, and the principles of specific implementations of the above modules or units can be referred to corresponding content in the above method embodiments, which are not repeated herein.

Figure 9:
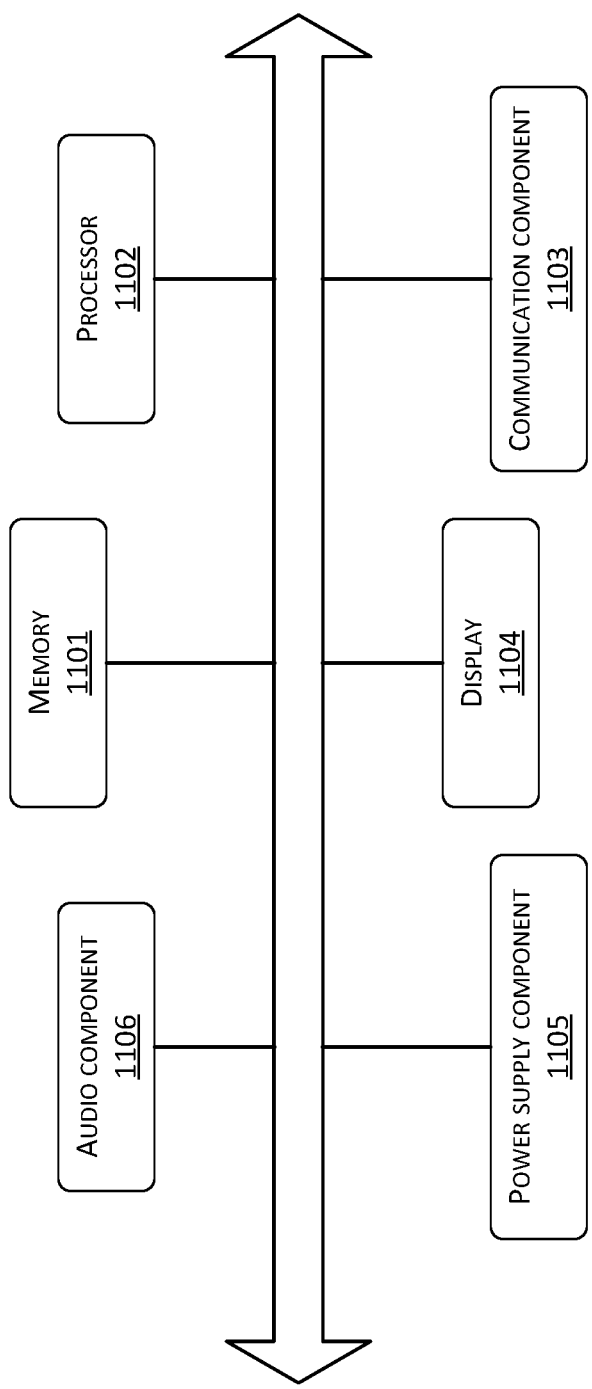
FIG. 9 is a structural block diagram of an electronic device provided by another embodiment of the present disclosure.

FIG. 9 shows a schematic structural diagram of an electronic device provided by an embodiment of the present disclosure. As shown in the figure, the electronic device includes a memory 1101 and a processor 1102. The memory 1101 may be configured to store other various data to support operations on the electronic device. Examples of such data include instructions for any application or method operating on the electronic device. The memory 1101 can be implemented by any type of volatile or non-volatile storage device or a combination thereof, such as static random access memory (SRAM), electrically erasable programmable read-only memory (EEPROM), erasable and programmable read-only memory (EPROM), programmable read-only memory (PROM), read-only memory (ROM), magnetic memory, flash memory, magnetic disk, or optical disk.

The memory 1101 is used to store a program;

The processor 1102 is coupled with the memory 1101, and is configured to execute the program stored in the memory 1101 to implement the service unit switching methods provided in the foregoing method embodiments.

Further, as shown in FIG. 9, the electronic device further includes other components, such as a communication component 1103, a display 1104, a power supply component 1105, an audio component 1106, etc. FIG. 9 only schematically shows part of the components, which does not mean that the electronic device only includes those components shown in FIG. 9.

Correspondingly, the embodiments of the present disclosure also provide a computer-readable storage medium storing a computer program. The computer program can realize the steps or functions of the service unit switching methods provided by the foregoing method embodiments when the computer program is executed by a computer.

The apparatus embodiments described above are merely illustrative. Units that are described as separate components may or may not be physically separated, and components displayed as units may or may not be physical units, i.e., may be located in a single place, or may be distributed over multiple network units. Some or all of the modules can be selected according to actual needs to achieve the objectives of the solutions of the embodiments. One of ordinary skill in the art can understand and implement thereof without making any creative effort.

Figure 13:
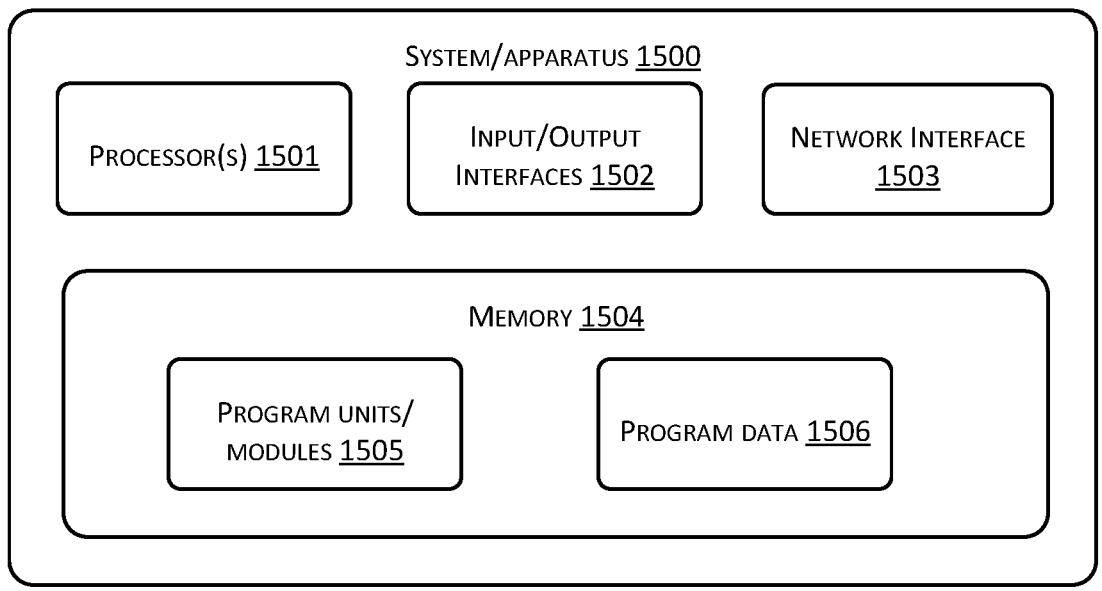
FIG. 13 is a structural block diagram of an example system/apparatus as described in FIGS. 1, 2, and 6-8 in more detail.

FIG. 13 shows an example system/apparatus 1500, such as the systems and apparatuses shown in FIGS. 1, 2, and 6-8 in further detail. In implementations, the example system/apparatus 1500 may represent any one of the foregoing systems and apparatuses. By way of example and not limitation, the system/apparatus 1500 may include one or more processors 1501, an input/output (I/O) interface 1502, a network interface 1503, and memory 1504.

The memory 1504 may include a form of computer readable media such as a volatile memory, a random access memory (RAM) and/or a non-volatile memory, for example, a read-only memory (ROM) or a flash RAM. The memory 1504 is an example of a computer readable media. In implementations, the memory 1504 may include program units/modules 1505 and program data 1506. The program units/modules 1505 may include one or more of the foregoing units and/or modules as described in the foregoing embodiments and shown in the figures.

The computer readable media may include a volatile or non-volatile type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

Through the description of the above implementations, one skilled in the art can clearly understand that each implementation can be implemented by software plus a necessary general hardware platform, and apparently can also be implemented by hardware. Based on such understanding, the essence of the above technical solutions or the parts that contribute to the existing technologies can be embodied in a form of a software product. Such computer software product can be stored in a computer-readable storage medium, such as ROM/RAM, a magnetic disk, an optical disk, etc., and include a number of instructions to make a computer device (which may be a personal computer, a server, or a network device, etc.) to execute the method described in each embodiment or some parts of the embodiment.

Finally, it should be noted that the above embodiments are only used to illustrate the technical solutions of the application, and do not have any limitations thereon. Although the application has been described in detail with reference to the foregoing embodiments, one of ordinary skill in the art should understand that the technical solutions recorded in the foregoing embodiments can be modified, or some of the technical features can be equivalently replaced. These modifications or replacements do not cause the essence of the corresponding technical solutions to deviate from the spirit and scope of the technical solutions of the embodiments of the present disclosure.

The present disclosure can be further understood using the following clauses.

Clause 1: A service unit switching method comprising: determining a target service unit; and triggering the target service unit to publish first routing information according to configuration information of a first service unit for a first load balancing task, to replace the first service unit to provide a traffic distribution service for the first load balancing task.

Clause 2: The method according to Clause 1, wherein the configuration information includes a virtual service address configured by the first service unit for the first load balancing task, and triggering the target service unit to publish the first routing information according to the configuration information of the first service unit for the first load balancing task includes: triggering the target service unit to publish the first routing information according to the virtual service address, to enable a service request for the virtual service address to be addressed to the target service unit.

Clause 3: The method according to Clause 2, wherein triggering the target service unit to publish the first routing information according to the virtual service address comprises: obtaining second routing information published by the first service unit for the virtual service address; and sending the second routing information to the target service unit to trigger the target service unit to publish the first routing information with a higher priority than the second routing information according to the virtual service address and the second routing information.

Clause 4: The method according to any one of Clauses 1 to 3, further comprising: sending a session sending instruction to the first service unit to trigger the first service unit to send recorded session information about the first load balancing task to the target service unit to allow the target service unit to reference with when distributing service requests related to established connections, wherein the recorded session information includes connection information of the established connections.

Clause 5: The method according to Clause 4, wherein the target service unit comprises a cluster composed of a plurality of second service nodes; sending the session sending instruction to the first service unit to trigger the first service unit to send the recorded session information about the first load balancing task to the target service unit includes: sending a session sending instruction to the first service unit to trigger the first service unit to send the recorded session information about the first load balancing task to a target service node among the plurality of second service nodes, the target service node synchronizing the recorded session information with other second service nodes among the plurality of second service nodes.

Clause 6: The method according to any one of Clauses 1 to 3, wherein triggering the target service unit to publish the first routing information according to the configuration information of the first service unit for the first load balancing task comprises: obtaining the configuration information of the first service unit for the first load balancing task; and sending the configuration information to the target service unit, to enable the target service unit to complete configuration according to the configuration information, and publishes the first routing information according to the configuration information.

Clause 7: The method according to Clause 6, wherein sending the configuration information to the target service unit comprises: sending the configuration information to a target management and control unit corresponding to the target service unit, to allow the target management and control unit to forward the configuration information to the target service unit.

Clause 8: The method according to any one of Clauses 1 to 3, further comprising: determining the first service unit, the first load balancing task, and the target service unit according to information to be migrated, wherein: the information to be migrated is determined according to detected operating conditions of multiple service units, the multiple service units including the first service unit and the target service unit; and the information to be migrated includes a virtual service address configured by the first service unit for the first load balancing task and a service address of the target service unit.

Clause 9: The method according to Clause 8, further comprising: receiving the information to be migrated that is sent by the global dispatching unit and determined according to the detected operating conditions of the multiple service units.

Clause 10: The method according to any one of Clauses 1 to 3, further comprising: triggering the first service unit to cancel the second routing information that has been published for the first load balancing task after receiving a publishing notification about the first routing information.

Clause 11: The method according to any one of Clauses 1 to 3, further comprising: triggering the first service unit to delete configuration related to the first load balancing task after receiving a publishing notification about the first routing information.

Clause 12: The method according to any one of Clauses 1 to 3, further comprising: receiving detection information detected by the target service unit for the first load balancing task; determining whether the target service unit satisfies a takeover condition according to the detection information; and performing the step of triggering the target service unit to publish the first routing information according to the configuration information of the first service unit for the first load balancing task when the target service unit satisfies the takeover condition.

Clause 13: The method according to Clause 12, wherein the detection information includes: first health status information obtained by the target service unit by detecting multiple back-end servers, wherein the multiple back-end servers are used to process service requests related to the first load balancing task; and determining whether the target service unit satisfies the takeover condition according to the detection information includes: determining whether the target service unit satisfies the takeover condition according to the first health status information.

Clause 14: The method according to Clause 13, wherein: the target service unit is a cluster composed of a plurality of second service nodes; the detection information further includes: an amount of synchronization of session information related to the first load balancing task among the plurality of second service nodes; and determining whether the target service unit satisfies the takeover condition according to the first health status information includes: determining whether the target service unit satisfies the takeover condition according to the first health status information and the amount of synchronization, the session information being recorded by the first service unit when providing the traffic distribution service for the first load balancing task.

Clause 15: The method according to Clause 14, wherein determining whether the target service unit satisfies the takeover condition according to the first health status information and the amount of synchronization comprises: obtaining second health status information obtained by the first service unit by detecting of the multiple back-end servers; determining whether a difference between the first health state detection information and the second health state detection information satisfies a first preset condition; determining a proportion of the amount of synchronization in a total amount of session information; and determining that the target service unit satisfies the takeover condition when the difference satisfies the first preset condition and the proportion is greater than a preset proportion.

Clause 16: A service unit switching method comprising: obtaining configuration information of a first service unit for a first load balancing task; and publishing first routing information according to configuration information, to replace the first service unit to provide a traffic distribution service for the first load balancing task.

Clause 17: The method according to Clause 16, wherein publishing the first routing information according to the configuration information comprises: obtaining second routing information that the first service unit has published for the first load balancing task; and publishing the first routing information with a higher priority than the second routing information according to the configuration information and the second routing information.

Clause 18: The method according to Clause 16 or 17, further comprising: receiving session information about the first load balancing task sent by the first service unit; and synchronizing the session information with other second service nodes in a cluster, each second service node in the cluster being used to provide traffic distribution services for the first load balancing task.

Clause 19: The method according to Clause 18, further comprising: sending detection information detected for the first load balancing task to a target management and control unit, to enable the target management and control unit to determine whether a takeover condition is satisfied according to the detection information; and the step of publishing the first routing information according to the configuration information after receiving a takeover instruction sent by the target management and control unit upon determining that the takeover condition is satisfied performing.

Clause 20: A service unit switching system comprising: a first service unit, a target service unit, and a first management and control unit respectively connected to the first service unit and the target service unit, wherein: the first management and control unit is configured to determine the target service unit, and trigger the target service unit to publish first routing information according to configuration information of the first service unit for a first load balancing task; the target service unit is configured to publish the first routing information according to the configuration information upon being triggered by the first management and control unit, so as to replace the first service unit to provide a traffic distribution service for the first load balancing task.

Clause 21: A service unit switching system comprising: a first service unit, a target service unit, a first management and control unit connected to the first service unit, and a target management and control unit connected to the target service unit, wherein: the first management and control unit is configured to obtain configuration information of the first service unit for a first load balancing task, and send the configuration information to the target management and control unit; the target management and control unit is configured to forward the configuration information to the target service unit, and trigger the target service unit to publish first routing information according to the configuration information; and the target service unit is configured to publish the first routing information according to the configuration information upon being triggered by the target management and control unit, so as to replace the first service unit to provide a traffic distribution service for the first load balancing task.

Clause 22: The system according to claim 21, further comprising: a global dispatching unit respectively connected to a plurality of management and control units; the plurality of management and control units including the first management and control unit and the target management and control unit, wherein: the global management and control unit is configured to send information to be migrated to the first management and control unit, to enable the first management and control unit to determine the first service unit and the first load balancing task, and the target load unit according to the information to be migrated; the information to be migrated is determined by the global management and control unit according to operating conditions of multiple service units, the multiple service units including the first service unit and the target service unit; and the information to be migrated includes a virtual service address configured by the first service unit for the first load balancing task and a service address of the target service unit.

Clause 23: An electronic device comprising: a memory and a processor, wherein: the memory is used to store a program; the processor is coupled with the memory, and is configured to execute the program stored in the memory for: determining a target service unit; and triggering the target service unit to publish first routing information according to configuration information of a first service unit for a first load balancing task, so as to replace the first service unit to provide a traffic distribution service for the first load balancing task.

Clause 24: An electronic device comprising: a memory and a processor, wherein: the memory is used to store a program; the processor is coupled with the memory, and is configured to execute the program stored in the memory for: obtaining configuration information of a first service unit for a first load balancing task; and publishing first routing information according to the configuration information, so as to replace the first service unit to provide a traffic distribution service for the first load balancing task.

Clause 25: A service unit switching method comprising: determining a target service unit; and triggering a target service unit to publish first routing information according to configuration information of a first service unit for a first task, so as to replace the first service unit to provide services for the first task.

Clause 26: An electronic device comprising: a memory and a processor, wherein: the memory is used to store a program; the processor is coupled with the memory, and is configured to execute the program stored in the memory for: determining a target service unit; and triggering a target service unit to publish first routing information according to configuration information of a first service unit for a first task, so as to replace the first service unit to provide services for the first task.

Clause 27: A service unit switching method comprising: obtaining configuration information of a first service unit for a first task; and publishing first routing information according to the configuration information, so as to replace the first service unit to provide services for the first task.

Clause 28: An electronic device comprising: a memory and a processor, wherein: the memory is used to store a program; the processor is coupled with the memory, and is configured to execute the program stored in the memory for: obtaining configuration information of a first service unit for a first task; and publishing first routing information according to the configuration information, so as to replace the first service unit to provide services for the first task.

What is claimed is:

1. A method implemented by a computing device, the method comprising:
   determining a target service unit; and
   triggering the target service unit to publish first routing information according to configuration information of a first service unit for a first load balancing task, to replace the first service unit to provide a traffic distribution service for the first load balancing task, wherein:
     attributes of a connection previously established by the first service unit for the first load balancing task have no change before and after the target service unit takes over the first service unit to provide the traffic distribution service for the first load balancing task;
     the first routing information published by the target service unit includes network segment information about a virtual service address configured by the first service unit for the first load balancing task; and
     a number after a designated symbol in the network segment information in the first routing information is larger than a number after the designated symbol in network segment information in second routing information published by the first service unit for the virtual service address, causing a degree of granularity of the network segment information in the first routing information to be finer than a degree of granularity of the network segment information in the second routing information, and the first routing information to have a higher priority as compared to the second routing information.

2. The method according to claim 1, wherein
the configuration information includes the virtual service address configured by the first service unit for the first load balancing task, and
triggering the target service unit to publish the first routing information according to the configuration information of the first service unit for the first load balancing task includes:
triggering the target service unit to publish the first routing information according to the virtual service address, to enable a service request for the virtual service address to be addressed to the target service unit.

3. The method according to claim 2, wherein triggering the target service unit to publish the first routing information according to the virtual service address comprises:
obtaining the second routing information published by the first service unit for the virtual service address; and
sending the second routing information to the target service unit to trigger the target service unit to publish the first routing information with the higher priority than the second routing information according to the virtual service address and the second routing information.

4. The method according to claim 1, further comprising:
sending a session sending instruction to the first service unit to trigger the first service unit to send recorded session information about the first load balancing task to the target service unit to allow the target service unit to reference with when distributing service requests related to established connections, wherein the recorded session information includes connection information of the established connections.

5. The method according to claim 4, wherein the target service unit comprises a cluster composed of a plurality of second service nodes and the sending includes:
sending a session sending instruction to the first service unit to trigger the first service unit to send the recorded session information about the first load balancing task to a target service node among the plurality of second service nodes, the target service node synchronizing the recorded session information with other second service nodes among the plurality of second service nodes.

6. The method according to claim 1, wherein triggering the target service unit to publish the first routing information according to the configuration information of the first service unit for the first load balancing task comprises:
obtaining the configuration information of the first service unit for the first load balancing task; and
sending the configuration information to the target service unit, to enable the target service unit to complete configuration according to the configuration information, and publish the first routing information according to the configuration information.

7. The method according to claim 6, wherein sending the configuration information to the target service unit comprises:
sending the configuration information to a target management and control unit corresponding to the target service unit, to allow the target management and control unit to forward the configuration information to the target service unit.

8. The method according to claim 1, further comprising:
determining the first service unit, the first load balancing task, and the target service unit according to information to be migrated, wherein:
the information to be migrated is determined according to detected operating conditions of multiple service units, the multiple service units including the first service unit and the target service unit; and
the information to be migrated includes a virtual service address configured by the first service unit for the first load balancing task and a service address of the target service unit.

9. The method according to claim 8, further comprising:
receiving the information to be migrated that is sent by a global dispatching unit and determined according to the detected operating conditions of the multiple service units.

10. The method according to claim 1, further comprising:
triggering the first service unit to cancel second routing information that has been published for the first load balancing task after receiving a publishing notification about the first routing information.

11. The method according to claim 1, further comprising:
triggering the first service unit to delete configuration related to the first load balancing task after receiving a publishing notification about the first routing information.

12. The method according to claim 1, further comprising:
receiving detection information detected by the target service unit for the first load balancing task; and
determining whether the target service unit satisfies a takeover condition according to the detection information, wherein triggering the target service unit to publish the first routing information according to the configuration information of the first service unit for the first load balancing task is performed when the target service unit satisfies the takeover condition.

13. The method according to claim 12, wherein:
the detection information includes: first health status information obtained by the target service unit by detecting multiple back-end servers, wherein the multiple back-end servers are used to process service requests related to the first load balancing task; and
determining whether the target service unit satisfies the takeover condition according to the detection information includes: determining whether the target service unit satisfies the takeover condition according to the first health status information.

14. The method according to claim 13, wherein:
the target service unit is a cluster composed of a plurality of second service nodes;
the detection information further includes: an amount of synchronization of session information related to the first load balancing task among the plurality of second service nodes; and
determining whether the target service unit satisfies the takeover condition according to the first health status information includes:
determining whether the target service unit satisfies the takeover condition according to the first health status information and the amount of synchronization, the session information being recorded by the first service unit when providing the traffic distribution service for the first load balancing task.

15. The method according to claim 14, wherein determining whether the target service unit satisfies the takeover condition according to the first health status information and the amount of synchronization comprises:
   obtaining second health status information obtained by the first service unit by detecting of the multiple back-end servers;
   determining whether a difference between the first health state detection information and the second health state detection information satisfies a first preset condition;
   determining a proportion of the amount of synchronization in a total amount of session information; and
   determining that the target service unit satisfies the takeover condition when the difference satisfies the first preset condition and the proportion is greater than a preset proportion.

16. One or more computer readable media storing executable instructions that, when executed by one or more processors, cause the one or more processors to perform acts comprising:
   obtaining configuration information of a first service unit for a first load balancing task, the configuration information including a virtual service address configured by the first service unit for the first load balancing task; and
   publishing first routing information according to the configuration information, to replace the first service unit to provide a traffic distribution service for the first load balancing task, wherein:
     attributes of a connection previously established by the first service unit for the first load balancing task have no change before and after the target service unit takes over the first service unit to provide the traffic distribution service for the first load balancing task;
     the first routing information published by the target service unit includes network segment information about the virtual service address; and
     a number after a designated symbol in the network segment information in the first routing information is larger than a number after the designated symbol in network segment information in second routing information published by the first service unit for the virtual service address, causing a degree of granularity of the network segment information in the first routing information to be finer than a degree of granularity of the network segment information in the second routing information, and the first routing information to have a higher priority as compared to the second routing information.

17. The one or more computer readable media according to claim 16, wherein publishing the first routing information according to the configuration information comprises:
   obtaining the second routing information that the first service unit has published for the first load balancing task; and
   publishing the first routing information with the higher priority than the second routing information according to the configuration information and the second routing information.

18. The one or more computer readable media according to claim 16, the acts further comprising:
   receiving session information about the first load balancing task sent by the first service unit; and
   synchronizing the session information with other second service nodes in a cluster, each second service node in the cluster being used to provide traffic distribution services for the first load balancing task.

19. The one or more computer readable media according to claim 18, the acts further comprising:
   sending detection information detected for the first load balancing task to a target management and control unit, to enable the target management and control unit to determine whether a takeover condition is satisfied according to the detection information, wherein publishing the first routing information according to the configuration information is performed after receiving a takeover instruction sent by the target management and control unit upon determining that the takeover condition is satisfied.

20. A system comprising:
one or more processors;
memory;
a first management and control unit stored in the memory and executable by the one or more processors that is configured to determine a target service unit, and trigger the target service unit to publish first routing information according to configuration information of a first service unit for a first load balancing task; and
the target service unit stored in the memory and executable by the one or more processors that is configured to publish the first routing information according to the configuration information upon being triggered by the first management and control unit, to replace the first service unit to provide a traffic distribution service for the first load balancing task, wherein:
   attributes of a connection previously established by the first service unit for the first load balancing task have no change before and after the target service unit takes over the first service unit to provide the traffic distribution service for the first load balancing task;
   the first routing information published by the target service unit includes network segment information about a virtual service address configured by the first service unit for the first load balancing task; and
   a number after a designated symbol in the network segment information in the first routing information is larger than a number after the designated symbol in network segment information in second routing information published by the first service unit for the virtual service address, causing a degree of granularity of the network segment information in the first routing information to be finer than a degree of granularity of the network segment information in the second routing information, and the first routing information to have a higher priority as compared to the second routing information.

\* \* \* \* \*